US008149598B2

(12) United States Patent
Mimura

(10) Patent No.: US 8,149,598 B2
(45) Date of Patent: Apr. 3, 2012

(54) SWITCHING POWER SUPPLY APPARATUS

(75) Inventor: Kohei Mimura, Osaka (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/573,279

(22) Filed: Oct. 5, 2009

(65) Prior Publication Data
US 2010/0085776 A1    Apr. 8, 2010

(30) Foreign Application Priority Data

Oct. 7, 2008 (JP) ................................. 2008-260542

(51) Int. Cl.
*H02M 3/335* (2006.01)
(52) U.S. Cl. ...................... 363/20; 363/20.04; 363/20.12
(58) Field of Classification Search .................... 363/15, 363/16, 18, 20, 21.04, 21.12
See application file for complete search history.

(56) References Cited

U.S. PATENT DOCUMENTS

| 6,366,479 | B1 | 4/2002 | Usui et al. | |
|---|---|---|---|---|
| 6,529,391 | B2 * | 3/2003 | Yoshinaga et al. | 363/21.15 |
| 6,922,345 | B2 * | 7/2005 | Nishida et al. | 363/21.16 |
| 7,161,815 | B2 * | 1/2007 | Mori | 363/21.12 |
| 7,310,248 | B2 * | 12/2007 | Mori | 363/21.16 |
| 7,339,804 | B2 | 3/2008 | Uchida | |
| 7,394,670 | B2 * | 7/2008 | Koike | 363/21.16 |
| 7,480,159 | B2 * | 1/2009 | Wei et al. | 363/21.18 |
| 7,492,615 | B2 * | 2/2009 | Morota et al. | 363/21.16 |
| 7,542,308 | B2 * | 6/2009 | Yamada | 363/21.01 |
| 2003/0095422 | A1 | 5/2003 | Nagaki et al. | |
| 2009/0116265 | A1 | 5/2009 | Saji | |
| 2010/0027300 | A1 * | 2/2010 | Fang | 363/21.16 |

FOREIGN PATENT DOCUMENTS

JP    3434788    5/2003

OTHER PUBLICATIONS

English language Abstract of JP 2001-224169, Aug. 17, 2001.

* cited by examiner

*Primary Examiner* — Matthew Nguyen
*Assistant Examiner* — Emily Pham
(74) *Attorney, Agent, or Firm* — Greenblum & Bernstein, P.L.C.

(57) ABSTRACT

A switching power supply apparatus according to the present invention includes a switching device and a control circuit, and the control circuit includes: a control terminal through which an auxiliary power voltage is supplied; an error amplifier which generates a difference voltage depending on a difference between a control terminal voltage and a first reference voltage; a device current detection circuit which generates a device current detection signal indicating an amount of a current flowing in the switching device; a drive circuit which generates a drive pulse signal having a duty cycle based on a difference between the difference voltage and the device current detection signal and drives the switching device by using the generated drive pulse signal; and a dummy load circuit through which a dummy load current flows from the control terminal when the difference voltage becomes equal to or higher than a second reference voltage.

8 Claims, 15 Drawing Sheets

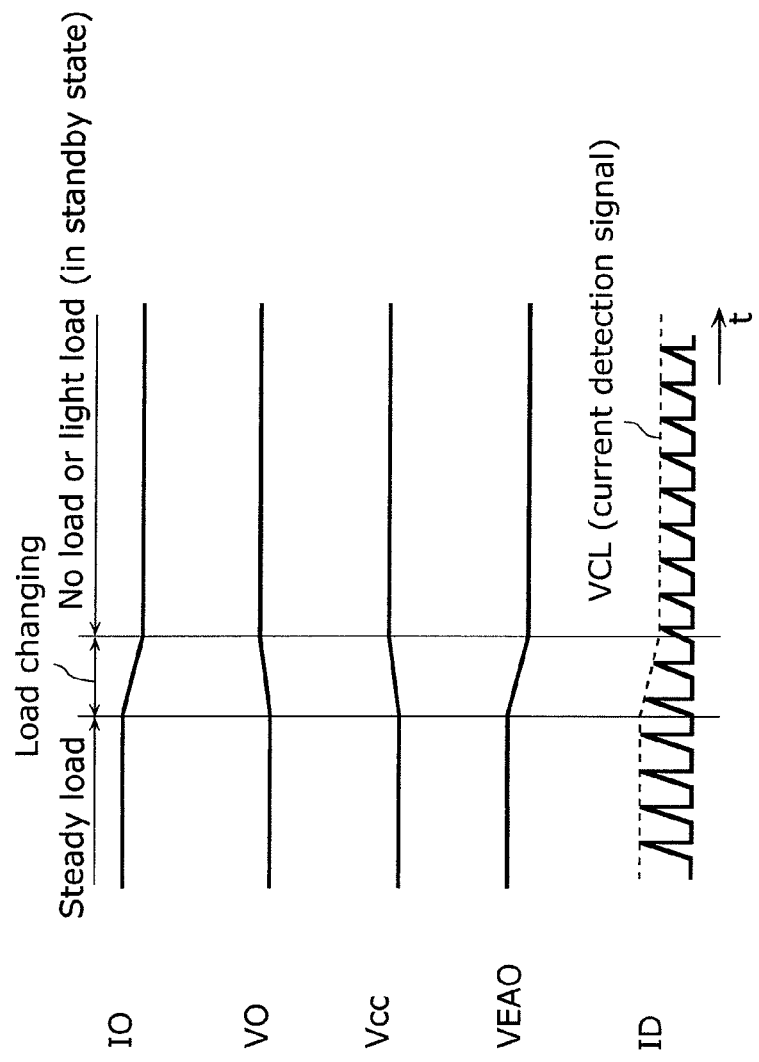

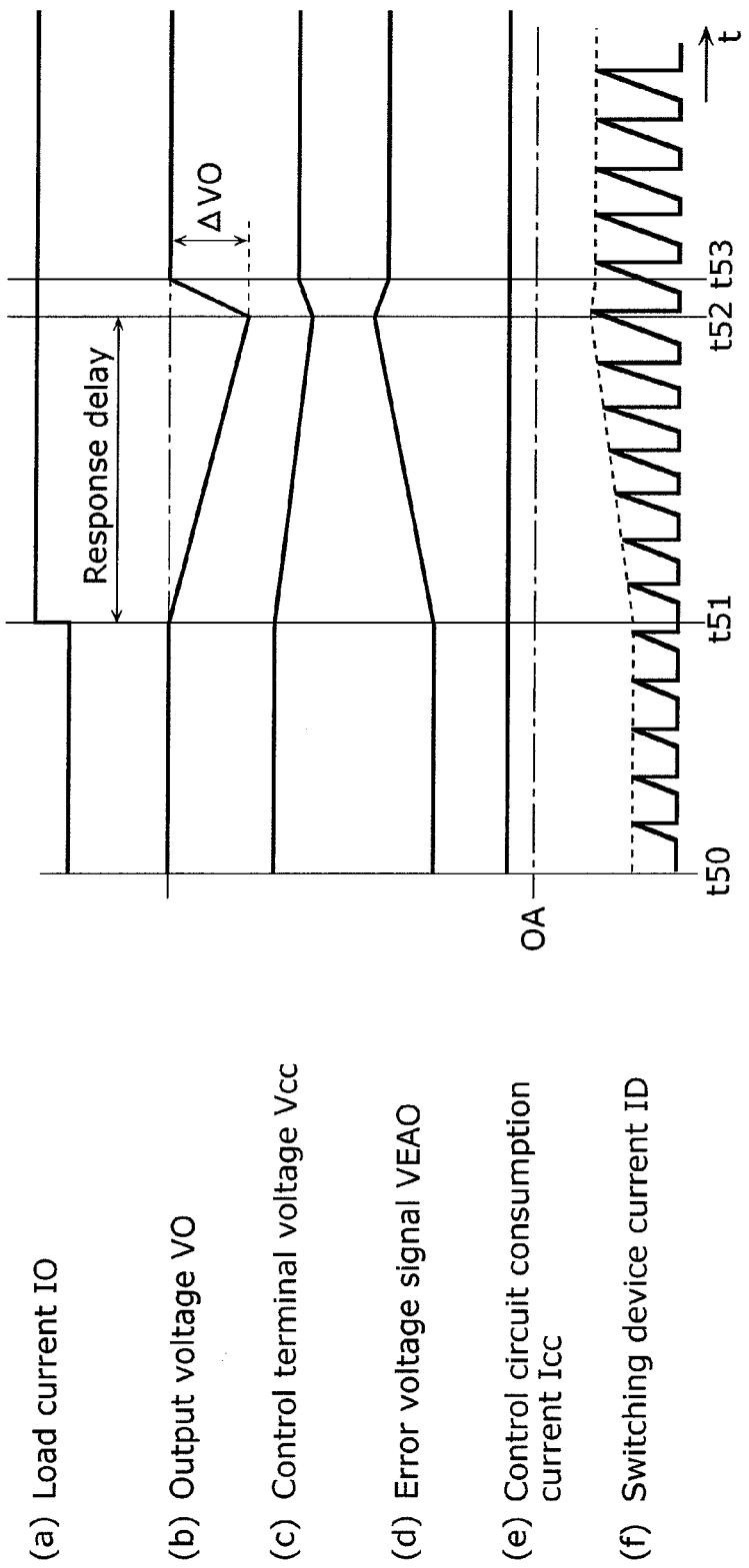

SWITCHING POWER SUPPLY APPARATUS

BACKGROUND OF THE INVENTION (1) Field of the Invention

The present invention relates to a switching power supply apparatus, and particularly relates to a switching power supply apparatus which inhibits change in output voltage when there is a sudden change in load.

(2) Description of the Related Art

A conventional switching power supply apparatus is described with reference to the drawings.

FIG. 13 is a circuit diagram showing a circuit configuration of a switching power supply apparatus of which an input side and an output side are electrically insulated. The switching power supply apparatus shown in the figure includes, for example, a switching device 104 made up of a power MOSFET and so on and a control circuit 130 which controls the switching device 104.

In the switching power supply apparatus shown in FIG. 13, for example, an alternating current (AC) which is inputted to a main input terminal from a commercial power source is rectified by a rectifier 101 configured with a diode bridge and so on. The AC is subsequently smoothed by an input capacitor 102 into a direct-current (DC) voltage VIN, and then is inputted to a transformer 103 for power conversion. The transformer 103 includes a primary winding 103a, an auxiliary winding 103b, and a secondary winding 103c, and the smoothed DC voltage VIN is inputted to the primary winding 103a.

The DC voltage VIN inputted to the primary winding 103a of the transformer 103 is controlled by the switching device 104. At this time, as a result of the switching operation of the switching device 104, an electromotive force is generated by electromagnetic induction in the secondary winding 103c of the transformer 103.

The current generated in the secondary winding 103c is rectified and smoothed by a diode 110 and an output capacitor 111 which are connected to the secondary winding 103c, so as to be supplied to a load 112 as the DC of an output voltage VO.

An electromotive force is also generated in the auxiliary winding 103b of the transformer 103, and the AC output from the auxiliary winding 103b is rectified and smoothed by a power voltage generation circuit 120 made up of a diode 121 and a capacitor 122, so that a control terminal voltage Vcc is generated.

The control circuit 130 driven by the control terminal voltage Vcc outputs a switching signal to a gate of the switching device 104. Here, the control terminal voltage Vcc is compared to the output voltage VO supplied to the load 112 from the secondary winding 103c of the transformer 103, and is also used as a return signal for stabilizing the output voltage VO.

The control circuit 130 includes: an oscillator 131 which outputs a clock signal CLOCK and a maximum duty cycle signal MAXDC for the switching signal to be outputted to the switching device 104; an error amplifier 132 which outputs an error voltage signal VEAO depending on a difference between the control terminal voltage Vcc and a reference voltage; a device current detection circuit 133 which detects a switching device current ID flowing in the switching device 104, so as to output a device current detection signal VCL; a comparator 134 which compares the error voltage signal VEAO and the device current detection signal VCL, so as to output a result of the comparison; and a switching signal control circuit 135 which controls an output of the switching signal based on the result of the comparison.

The switching signal control circuit 135 includes an RS flip-flop circuit 136 which receives, at a set terminal, the clock signal CLOCK from the oscillator 131 and receives, at a reset terminal, a signal output from the comparator 24; a NAND circuit 137 which receives, at an input terminal, a maximum duty cycle signal MAXDC from an oscillator 131 and receives, at another input terminal, a signal output from the RS flip-flop circuit 136; and a gate driver 138 which receives a signal output from the NAND circuit 137, so as to output a switching signal by performing inverting amplification on the signal.

The following will describe an operation of the conventional switching power supply apparatus configured as above.

In FIG. 13, immediately after the switching power supply apparatus is started, when an AC from a commercial power source is inputted to the rectifier 101, the inputted AC is rectified and smoothed by the rectifier 101 and the input capacitor 102 to be converted into a DC voltage VIN, and the converted DC voltage VIN is applied to the primary winding 103a of the transformer 103. At this time, the DC voltage VIN is applied to an internal current supply circuit 139 included in the control circuit 130, and the capacitor 122 of the power voltage generation circuit 120 is charged with a current supply from the internal current supply circuit 139.

After this, in the power voltage generation circuit 120, the control circuit 130 starts operating when the control terminal voltage Vcc reaches the start-up voltage of the control circuit 130. This causes the switching device 104 to start controlling the switching operation and also causes a start-and-stop circuit 140 to stop the current supply from the internal current supply circuit 139.

The control circuit 130 controls the switching operation performed by the switching device 104, based on the control terminal voltage Vcc so as to stabilize the output voltage VO to the load 112 at a predetermined voltage. Specifically, the output voltage VO to the load 112 and the control terminal voltage Vcc are applied in accordance with a ratio between the auxiliary winding 103b and the secondary winding 103c of the transformer 103. Furthermore, the comparator 134 compares the error voltage signal VEAO from the error amplifier 132 and the device current detection signal VCL from the device current detection circuit 133, so as to provide a high-level output signal to the reset terminal of the RS flip-flop circuit 136 when the error voltage signal VEAO and the device current detection signal VCL become equal to each other. This controls the switching operation so that the output voltage VO returns to the predetermined voltage even when the output voltage VO changes.

FIG. 14 is a timing chart showing an operation of the conventional switching power supply apparatus having such a configuration.

As the figure shows, at the time of change in load, when a load supply current IO decreases due to a decrease in the amount of current supplied to the load 112, an output voltage VO slightly increases. In response to this, the control terminal voltage Vcc of the power voltage generation circuit 120 increases on a return side, and the error voltage signal VEAO from the error amplifier 132 decreases.

When the error voltage signal VEAO and the device current detection signal VCL become equal to each other, a reset signal is outputted from the comparator 134 to the reset terminal of the RS flip-flop circuit 136: thus, at the time of decrease in the load current, due to decrease in error voltage signal VEAO, the NAND circuit 137 outputs a signal for turning off the switching device 104 with timing earlier than in a steady-load period. As a result, this shortens the time for which the switching device 104 is on during the switching operation, causing a decrease in the switching device current ID flowing in the switching device 104.

Thus, the control circuit 130 in the conventional switching power supply apparatus stabilizes the output voltage VO in response to a change in the load supply current IO supplied to the load 112, by controlling the duty cycle of the switching device 104 according to the control terminal voltage Vcc proportional to the output voltage VO. Specifically, the control circuit 130 performs control to make the peak of the switching device current ID shorter by shortening the duty cycle of the switching device 104 as the control terminal voltage Vcc is larger. Patent Reference 1 (Japanese Patent No. 3434788), for example, discloses the technique related to this control.

SUMMARY OF THE INVENTION

However, in a conventional switching power supply apparatus, there is a problem of transitional change in output voltage which is caused by a delay in response of the control terminal voltage in the case of sudden change in the load current.

FIG. 15 is a timing chart showing the operation of the conventional switching power supply apparatus at a time of sudden change in load current. The figure shows that: from time t50 to t51, the conventional switching power supply apparatus is operating at no load or light load; at time t51, there is a sudden change in the load current; and subsequently, the conventional switching power supply apparatus is operating at steady load.

As shown at time t51, when the load current IO increases, the switching power supply apparatus inhibits decrease in the output voltage VO by increasing the switching device current ID flowing in the switching device 104 in response to the decreases in the output voltage VO and the control terminal voltage Vcc of the power voltage generation circuit 120. However, the speed of the response of the control terminal voltage Vcc to the load current IO is determined by the consumption current Icc flowing in the capacitor 122 and the control circuit 130. Accordingly, in the case of sudden change in the load current IO, the control terminal voltage Vcc cannot change rapidly in response to the change in the load current IO, tapering during a period from t51 to t52.

That is, during the period from t51 to t52, it is not possible to supply a sufficient switching device current ID to the switching power supply apparatus. This causes a problem in the conventional switching power supply apparatus that the output voltage VO decreases by ΔVO as shown at time t52. Furthermore, since the capacitor 122 requires a large capacitance value for stabilizing the control terminal voltage Vcc, the output voltage VO decreases more significantly due to the decrease in the response speed of the control terminal voltage Vcc.

Thus, in order to solve the problem as above, an object of the present invention is to provide a switching power supply apparatus which can inhibit change in output voltage at the time of sudden change in the load current.

In order to achieve the object described above, a switching power supply apparatus according to an aspect of the present invention includes: a transformer including a primary winding, a secondary winding, and an auxiliary winding; a switching device connected in series with the primary winding; an auxiliary power voltage circuit which is connected to the auxiliary winding and generates an auxiliary power voltage by using an alternating-current voltage induced in the auxiliary winding; and a control circuit which controls an operation of the switching device, and the control circuit includes: a power source terminal through which the auxiliary power voltage is supplied; a difference device which generates a difference voltage depending on a difference between the auxiliary power voltage and a first reference voltage; a device current detection circuit which detects a device current flowing in the switching device, and generates a device current detection signal indicating an amount of the device current; a drive circuit which generates a drive pulse signal having a duty cycle based on a difference between the difference voltage and the device current detection signal, and drives the switching device by using the generated drive pulse signal; and a dummy load circuit through which a dummy load current flows from the power source terminal when the difference voltage becomes equal to or higher than a second reference voltage.

With this, by the dummy load current flowing at the time of sudden change in the load current, the voltage applied to the power source terminal suddenly decreases, and the duty cycle of the drive pulse signal changes accordingly. For example, the drive pulse signal remains active for a longer period of time during one cycle. As a result, it is possible to inhibit change in the voltage in the secondary winding, that is, the change in the output voltage.

In addition, the control circuit may further include an oscillator which generates a first clock signal, and the drive circuit may activate the drive pulse signal in accordance with the first clock signal, and may deactivate the drive pulse signal when the device current detection signal becomes equal to the difference voltage.

In addition, the dummy load circuit may include: a resistor having one end connected to the power source terminal; and a dummy load transistor which has one of a source and a drain connected to another end of the resistor and turns on and off according to a dummy control signal indicating that the difference voltage applied to a gate has become equal to or higher than the second reference voltage.

Since this allows an easy configuration of the dummy load circuit, it is possible to reduce increase in circuit size.

In addition, the dummy load circuit may further include a conduction time control circuit which activates the dummy control signal for a given period of time from when the difference voltage becomes equal to or higher than the second reference voltage.

With this, it is possible to reduce the consumption current of the control circuit during the steady-load period when the difference voltage is equal to or higher than the second reference voltage.

In addition, the control circuit may further include an intermittent oscillation circuit which causes the drive circuit to stop generating the drive pulse signal when the difference voltage becomes lower than a lower limit reference voltage, and causes the drive circuit to start generating the drive pulse signal when the difference voltage becomes higher than an upper limit reference voltage that is higher than the lower limit reference voltage.

With this, during a light-load period when the difference voltage is equal to or lower than the second reference voltage, the number of times of switching performed by the switching device per unit time decreases, thereby making it possible to reduce switching loss.

In addition, the upper limit reference voltage may be higher than the second reference voltage, and the intermittent oscillation circuit may inhibit the dummy load circuit from operating when the difference voltage signal is equal to or lower than the upper limit reference voltage.

With this, it is possible to reduce the consumption current of the control circuit during the light-load period.

In addition, the oscillator may generate a second clock signal for limiting a maximum length of period for which the drive pulse signal remains active.

In addition, a switching power supply apparatus according to another aspect of the present invention includes: a transformer including a primary winding, a secondary winding, and an auxiliary winding; a switching device connected in series with the primary winding; an auxiliary power voltage circuit which is connected to the auxiliary winding and generates an auxiliary power voltage by using an alternating-current voltage induced in the auxiliary winding; and a control circuit which controls an operation of the switching device, and in the control circuit includes: a power source terminal through which the auxiliary power voltage is supplied; a difference device which generates a difference voltage depending on a difference between the auxiliary power voltage and a first reference voltage; a device current detection circuit which detects a device current flowing in the switching device, and generates a device current detection signal indicating an amount of the device current; a drive circuit which generates a drive pulse signal having a duty cycle based on a difference between the difference voltage and the device current detection signal, and drives the switching device by using the generated drive pulse signal; an intermittent oscillation circuit which causes the drive circuit to stop generating the drive pulse signal when the difference voltage becomes lower than a lower limit reference voltage, and causes the drive circuit to start generating the drive pulse signal when the difference voltage becomes higher than an upper limit reference voltage that is higher than the lower limit reference voltage; and a dummy load circuit through which a dummy load current flows from the power source terminal during a period when the drive pulse signal is sequentially generated more than a predetermined number of times.

With this, the control terminal voltage Vcc is caused to drop suddenly by the dummy load current flowing when the drive pulse signal is sequentially generated at least the predetermined number of times, so that the duty cycle of the drive pulse signal changes accordingly. For example, the drive pulse signal remains active for a longer period of time during one cycle. As a result, it is possible to inhibit the change in the output voltage VO.

Further Information about Technical Background to this Application

The disclosure of Japanese Patent Application No. 2008-260542 filed on Oct. 7, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 14 is a timing chart showing an operation of a conventional switching power supply apparatus; and FIG. 15 is a timing chart showing the operation of the conventional switching power supply apparatus at a time of sudden change in load current.

DESCRIPTION OF THE PREFERRED EMBODIMENTS

Hereinafter, a switching power supply apparatus representing an embodiment of the present invention is specifically described with reference to the drawings.

First Embodiment

A switching power supply apparatus according to the first embodiment of the present invention includes: a transformer including a primary winding, a secondary winding, and an auxiliary winding; a switching device connected in series with the primary winding; an auxiliary power voltage circuit which is connected to the auxiliary winding and generates an auxiliary power voltage by using an alternating-current voltage induced in the auxiliary winding; and a control circuit which controls an operation of the switching device, and the control circuit includes: a power source terminal through which the auxiliary power voltage is supplied; a difference device which generates a difference voltage depending on a difference between the auxiliary power voltage and a first reference voltage; a device current detection circuit which detects a device current flowing in the switching device, and generates a device current detection signal indicating an amount of the device current; a drive circuit which generates a drive pulse signal having a duty cycle based on a difference between the difference voltage and the device current detection signal, and drives the switching device by using the generated drive pulse signal; and a dummy load circuit through which a dummy load current flows from the power source terminal when the difference voltage becomes equal to or higher than a second reference voltage. With this, it is possible to inhibit change in the output to voltage at the time of sudden change in the load current.

Figure 1:
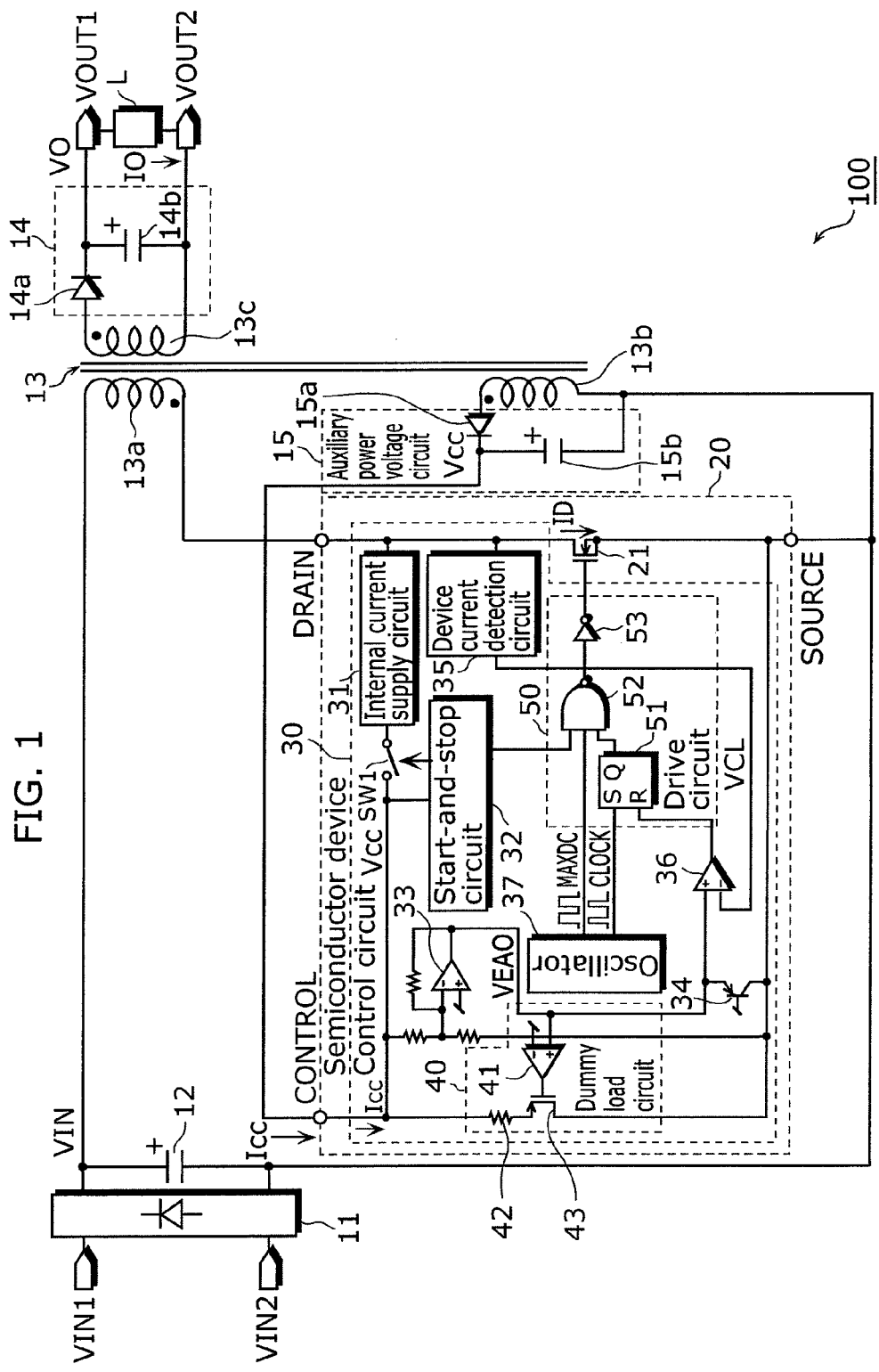
FIG. 1 is a circuit diagram showing an example of a configuration of a switching power supply apparatus according to a first embodiment of the present invention.

FIG. 1 is a block diagram showing an example of a configuration of a switching power supply apparatus according to a first embodiment of the present invention. Note that the figure also shows a load L connected to an output side of the switching power supply apparatus.

A switching power supply apparatus 100 shown in the figure includes: a rectifier 11, a capacitor 12, a transformer 13, an output voltage generation circuit 14, an auxiliary power voltage circuit 15, and a semiconductor device 20. The switching power supply apparatus 100 generates an input voltage VIN that is substantially DC based on an AC voltage input to a primary side, and supplies, to the load L, an output voltage VOUT that is substantially DC. The switching power supply apparatus 100 inhibits change in the output voltage VOUT when the amount of the load L suddenly changes. In addition, the semiconductor device 20 includes: a switching device 21, a control circuit 30, a drain terminal DRAIN, a control terminal CONTROL, and a source terminal SOURCE.

The rectifier 11 is a diode bride, for example, which rectifies an AC voltage inputted to between an input terminal VIN1 and an input terminal VIN2 and outputs a voltage at both ends of the capacitor 12.

The capacitor 12, which is inserted between the two terminals of the rectifier 11, generates a substantially DC input voltage VIN by smoothing the AC voltage rectified by the rectifier 11.

The transformer 13 includes a primary winding 13a, an auxiliary winding 13b, and a secondary winding 13c, and converts electric power input to the primary winding 13a and outputs the converted electric power from the secondary winding 13c. The primary winding 13a, which has one end connected to an end of the capacitor 12 and the other end connected to the drain terminal DRAIN, supplies a device current flowing in the switching device 21. The auxiliary winding 13b is connected to the auxiliary power voltage circuit 15 and generates a start-up power by electromagnetic induction caused by a change in the current flowing through the primary winding 13a and the secondary winding 13c. The secondary winding 13c, which has an opposite polarity character to the primary winding 13a and has the same polarity as the auxiliary winding 13b, is connected to the output voltage generation circuit 14. The secondary winding 13c generates a start-up power by electromagnetic induction caused by a change in the current flowing in the primary winding 13a, and supplies the current caused by the generated start-up power to the output voltage generation circuit 14.

The output voltage generation circuit 14 includes a diode 14a and a capacitor 14b, and supplies a DC power of the output voltage VO to the load L by rectifying, in the diode 14a, the current caused by the start-up power generated in the secondary winding 13c and smoothing, in the capacitor 14b, the rectified current.

The auxiliary power voltage circuit 15, which is connected to the auxiliary winding 13b, generates the control terminal voltage Vcc that is to be supplied to the control terminal CONTROL of the semiconductor device 20. Specifically, the auxiliary power voltage circuit 15 includes a diode 15a and a capacitor 15b, and generates a control terminal voltage Vcc that is substantially DC by rectifying and smoothing the start-up power generated in the auxiliary winding 13b by electromagnetic induction. Note that the control terminal CONTROL corresponds to a power source terminal in the present invention.

Next is a description of a detailed structure of the semiconductor device 20 including the switching device 21 and the control circuit 20.

Figure 2:
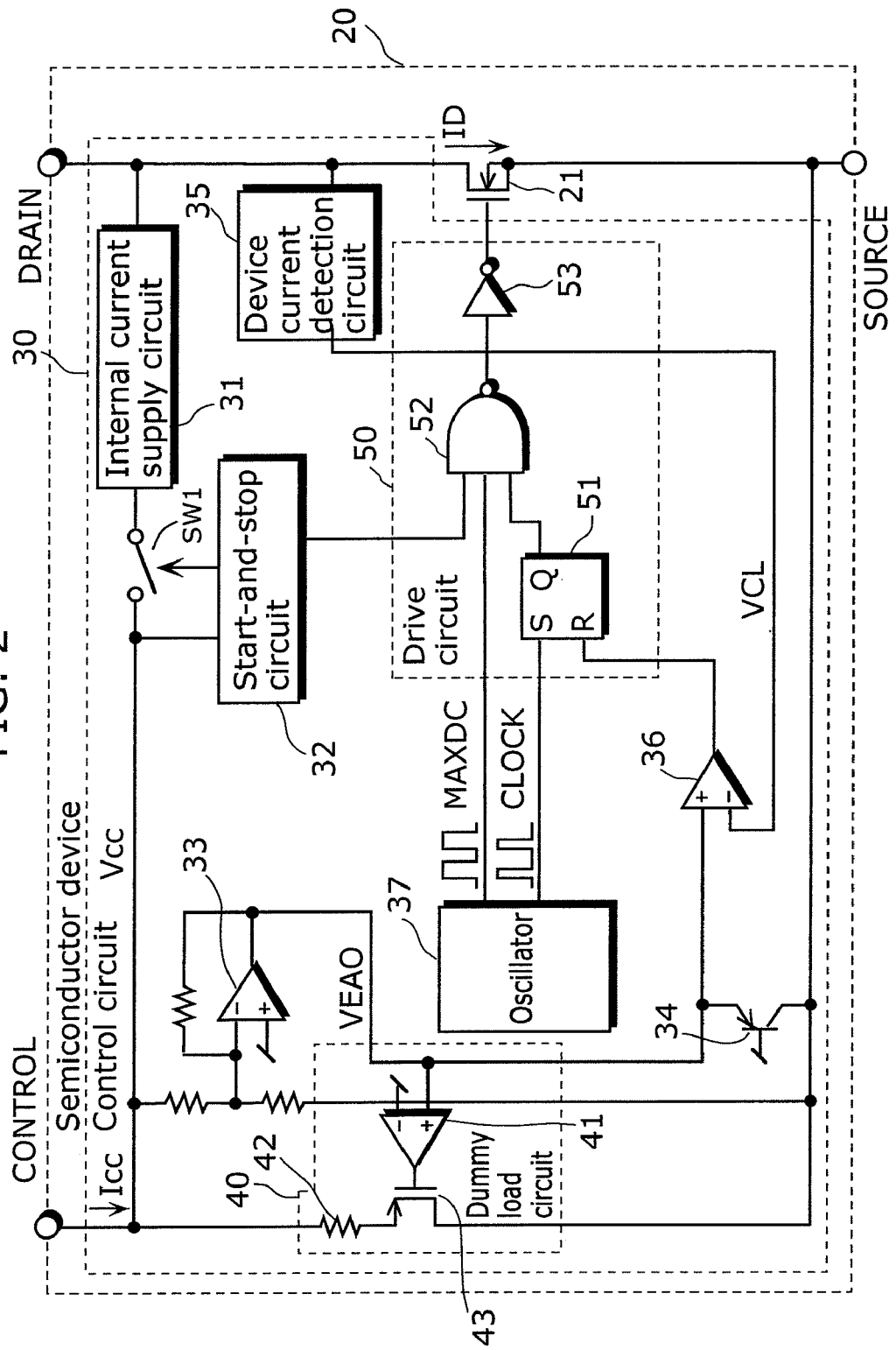
FIG. 2 is a circuit diagram showing an example of a configuration of a semiconductor device in the switching power supply apparatus according to the first embodiment of the present invention.

FIG. 2 is a circuit diagram showing an example of a configuration of the semiconductor device 20 in the switching power supply apparatus 100 according to the first embodiment of the present invention.

As the figure shows, the semiconductor device 20 includes the switching device 21 and the control circuit 30.

The switching device 21 is connected in series with the primary winding 13a via the drain terminal DRAIN, and undergoes switching control in accordance with a drive pulse signal outputted from the control circuit 30. That is, in the switching device 21, an amount of the switching device current ID flowing between the drain and the source is caused to change by the repetition of on and off statuses. The switching device 21 is configured with, for example, a transistor device such as a negative-channel metal oxide semiconductor (NMOS) and an insulated gate bipolar transistor (IGBT). Note that the switching device 21 may include one transistor device or may include plural transistor devices.

The control circuit 30 is a circuit which generates a drive pulse signal that drives the switching device 21, and includes: an internal current supply circuit 31, a start-and-stop circuit 32, an error amplifier 33, an overcurrent protection circuit 34, a device current detection circuit 35, a comparator 36, an oscillator 37, a dummy load circuit 40, and a drive circuit 50.

The internal current supply circuit 31, which has one end connected to the primary winding 13a via the drain terminal DRAIN and the other end connected to the control terminal CONTROL via a switch SW1, applies a DC voltage VIN to the auxiliary power voltage circuit 15 immediately after the start-up of the switching power supply apparatus 100. This starts charging the capacitor 15b in the auxiliary power voltage circuit 15, so that the control terminal voltage Vcc increases. When the control terminal voltage Vcc reaches the start-up voltage of the control circuit 30, the control circuit 30 starts operating, and thus starts controlling the switching operation of the switching device 21.

The start-and-stop circuit 32 permits and inhibits application of voltage by the internal current supply circuit 31 to the auxiliary power voltage circuit 15, by performing on-and-off control on the switch SW1. Specifically, the start-and-stop circuit 32 keeps the switch SW1 on until the control terminal voltage Vcc of the control circuit 30 reaches the start-up voltage of the control circuit 30. At this time, the capacitor 122 of the power voltage generation circuit 120 is charged when the DC voltage VIN is applied to the power voltage generation circuit 120 via the internal current supply circuit 31 included in the control circuit 30. On the other hand, the switch SW1 is turned off when the control terminal voltage Vcc reaches the start-up voltage of the control circuit 30. This allows the internal current supply circuit 31 to operate only at the start-up time, thus making it possible to reduce the consumption current during a normal operation after the start-up.

In addition, the start-and-stop circuit 32 outputs, to a drive circuit 50, a start-up control signal which indicates that the switching operation of the switching device 21 has started. Specifically, until the control terminal voltage Vcc reaches the start-up voltage of the control circuit 30, the start-up control signal remains at a low level, inhibiting the switching operation of the switching device 21. On the other hand, when the control terminal voltage Vcc reaches the start-up voltage of the control circuit 30, the start-up control signal is switched from the low level to a high level, so as to start the switching operation of the switching device 21.

The error amplifier 33, which has an inverting input terminal connected to the control terminal CONTROL via a resistor and has a non-inverting input terminal applied with a reference voltage Vcc1 that is a first reference voltage, generates an error voltage signal VEAO depending on a difference between the control terminal voltage Vcc that has decreased via the resistor and the reference voltage Vcc1.

The overcurrent protection circuit 34, which has a first terminal connected to an output terminal of the error amplifier 33 and has a second terminal connected to the source terminal SOURCE, is, for example, a PNP bipolar transistor, which clamps the maximum value of the error voltage signal VEAO. Specifically, the overcurrent protection circuit 34 clamps the maximum value of the device current ID flowing in the switching device 21 by clamping the maximum value of the error voltage signal VEAO.

The device current detection circuit 35 detects an amount of the device current ID flowing in the drain of the switching device 21. In addition, the device current detection circuit 35 generates a device current detection signal VCL indicating a signal which monotonically increases with respect to the amount of the device current ID. The device current detection signal VCL changes in response to the output voltage VOUT. Specifically, the device current detection signal VCL is a signal which changes, in response to the output voltage VOUT, in a direction inverse to a direction in which the error voltage signal VEAO changes. For example, when the output voltage VOUT increases, the error voltage signal VEAO decreases, and the device current detection signal VCL increases. The device current detection signal VCL is inputted to the non-inverting input terminal of the comparator 36. Note that the device current detection circuit 35 may generate the device current detection signal VCL by detecting the voltage between the drain and the source of the switching device 21.

In the comparator 36, the device current detection signal VCL is inputted to the non-inverting input terminal, and the error voltage signal VEAO is inputted to the inverting input terminal. The comparator 36 compares the device current detection signal VCL and the error voltage signal VEAO, and generates a comparison result signal indicating the result of the comparison. The comparison result signal controls the drive circuit 50 so as to deactivate the drive pulse signal at a point in time when the device current detection signal VCL and the error voltage signal VEAO become equal to each other. Specifically, the comparator 36 switches the comparison result signal from low to high when the level of the device current detection signal becomes equal to or higher than the level of the error voltage signal VEAO.

The oscillator 37 generates a clock signal CLOCK having a given frequency and a maximum duty cycle signal MAXDC, so as to input these generated signals to the drive circuit 50. The maximum duty cycle signal MAXDC represents a maximum length of time for which the switching device 21 is on. Note that the clock signal CLOCK corresponds to a first clock signal in the present invention, and the maximum duty cycle signal MAXDC corresponds to a second clock signal in the present invention.

A dummy load circuit 40, which is connected to the control terminal CONTROL, the output terminal of the error amplifier 33, and the source terminal SOURCE, supplies a dummy load current from the control terminal CONTROL to the source terminal SOURCE when the error voltage signal VEAO becomes equal to or higher than the reference voltage VEAO1. The dummy load circuit 40 includes a comparator 41, a resistor 42, and a dummy load device 43. Note that the reference voltage VEAO1 corresponds to a second reference voltage in the present invention.

In the comparator 41, the error voltage signal VEAO is inputted to a non-inverting input terminal, and the reference voltage VEAO1 is inputted to an inverting input terminal. The comparator 41 compares the error voltage signal VEAO and the reference voltage VEAO1, and generates a dummy control signal indicating the result of the comparison. The dummy control signal controls the dummy load device 43 so that the dummy load current flows from the control terminal CONTROL to the source terminal SOURCE when the error voltage signal VEAO is equal to or higher than the reference voltage VEAO1. Specifically, the comparator 41 switches the dummy control signal from high to low when the level of the error voltage signal VEAO becomes equal to or larger than the reference voltage VEAO1.

The resistor 42, which has one end connected the control terminal CONTROL and the other end connected to the dummy load device 43, defines an amount of the dummy load current.

The dummy load device 43 corresponds to a dummy load transistor in the present invention and includes a source, a drain, and a gate. The dummy load device 43, having the source connected to the control terminal CONTROL via the resistor 42 and the drain connected to the source terminal SOURCE, turns on and off in accordance with the dummy control signal supplied to the gate. With this, the switching power supply apparatus 100 supplies the dummy load current from the control terminal CONTROL to the source terminal SOURCE via the dummy load circuit 40. The dummy load device 43 is configured with, for example, a positive-channel metal-oxide semiconductor field-effect transistor (p-type MOSFET). Note that the dummy load device 43 may include one transistor device or may include plural transistor devices.

In the dummy load circuit 40 thus configured, the dummy control signal is switched to low when the error voltage signal VEAO is equal to or higher than the reference voltage VEAO1, thus causing the dummy load device 43 to turn on. With this, the dummy load current flows from the control terminal CONTROL to the dummy load circuit 40. In other words, the consumption current Icc of the control circuit 30, which is supplied from the control terminal CONTROL, is caused to increase. As a result, the control terminal voltage Vcc decreases.

The drive circuit 50 generates a drive pulse signal, based on the maximum duty cycle signal MAXDC and the clock signal CLOCK that are generated by the oscillator 37, and the comparison result signal generated by the comparator 36. The drive circuit 50 includes an RS flip-flop circuit 51, a NAND circuit 52, and a gate driver 53.

In the RS flip-flop circuit 51, the clock signal CLOCK is inputted to a set terminal S from the oscillator 37 and the comparison result signal is inputted to a reset terminal R from the comparator 36. In other words, the comparator 36 resets the RS flip-flop circuit 51 by using the comparison result signal at a point in time when the device current detection signal VCL and the error voltage signal VEAO become equal.

This RS flip-flop circuit 51 outputs the flip-flop signal through the non-inverting output terminal Q by performing an RS flip-flop operation. Specifically, the RS flip-flop circuit 51 keeps the flip-flop signal high when the clock signal CLOCK is high and the comparison result signal is low, and keeps the flip-flop signal low when the clock signal CLOCK is low and the comparison result signal is high. In other words, during a period of time from a rise of the clock signal CLOCK to a rise of the comparison result signal, the RS flip-flop circuit 51 keeps the flip-flop signal high, and during a period of time from the rise of the comparison result signal to a rise of the clock signal CLOCK, the flip-flop signal is held low. That is, the RS flip-flop circuit 51 generates the flip-flop signal which causes the switching device 21 to turn on in a set state and to turn off in a reset state.

The NAND circuit 52 has three input terminals, and generates, so as to output to the gate driver 53, a signal representing a logical NOT of a drive pulse signal that is a logical AND of the three input signals: the flip-flop signal outputted from the RS flip-flop circuit 51, the maximum duty cycle signal MAXDC outputted from the oscillator 37, and the start-up control signal outputted from the start-and-stop circuit 32. With this, even when the comparison result signal remains low since the rise of the clock signal CLOCK, the drive pulse signal is switched to low after a lapse of a period when the maximum duty cycle signal MAXDC remains high. In other words, the maximum duty cycle signal MAXDC limits a length of time in which the drive pulse signal remains active.

The gate driver 53 is an inverter which outputs a logical NOT of an input signal and generates, so as to apply to the gate terminal of the switching device 21, another logical NOT of the logical NOT of the drive pulse signal outputted from the NANDS circuit 52. That is, the gate driver 53 applies a logical AND of the flip-flop signal, the maximum duty cycle signal MAXDC, and the start-up control signal as the drive pulse signal to the gate terminal of the switching device 21. The drive pulse signal is switched to high when the flip-flop signal, the maximum duty cycle signal MAXDC, and the start-up control signal are all high, and is switched to low in other cases.

The drive circuit 50 thus configured causes the switching device 21 to turn on at a point in time when the clock signal CLOCK is outputted from the oscillator 37 and to turn off at a point in time when the device current detection signal VCL becomes equal to the error voltage signal VEAO.

Next is a description of how the switching power supply apparatus 100 configured as above operates at the time of sudden change in the load current.

Figure 3:
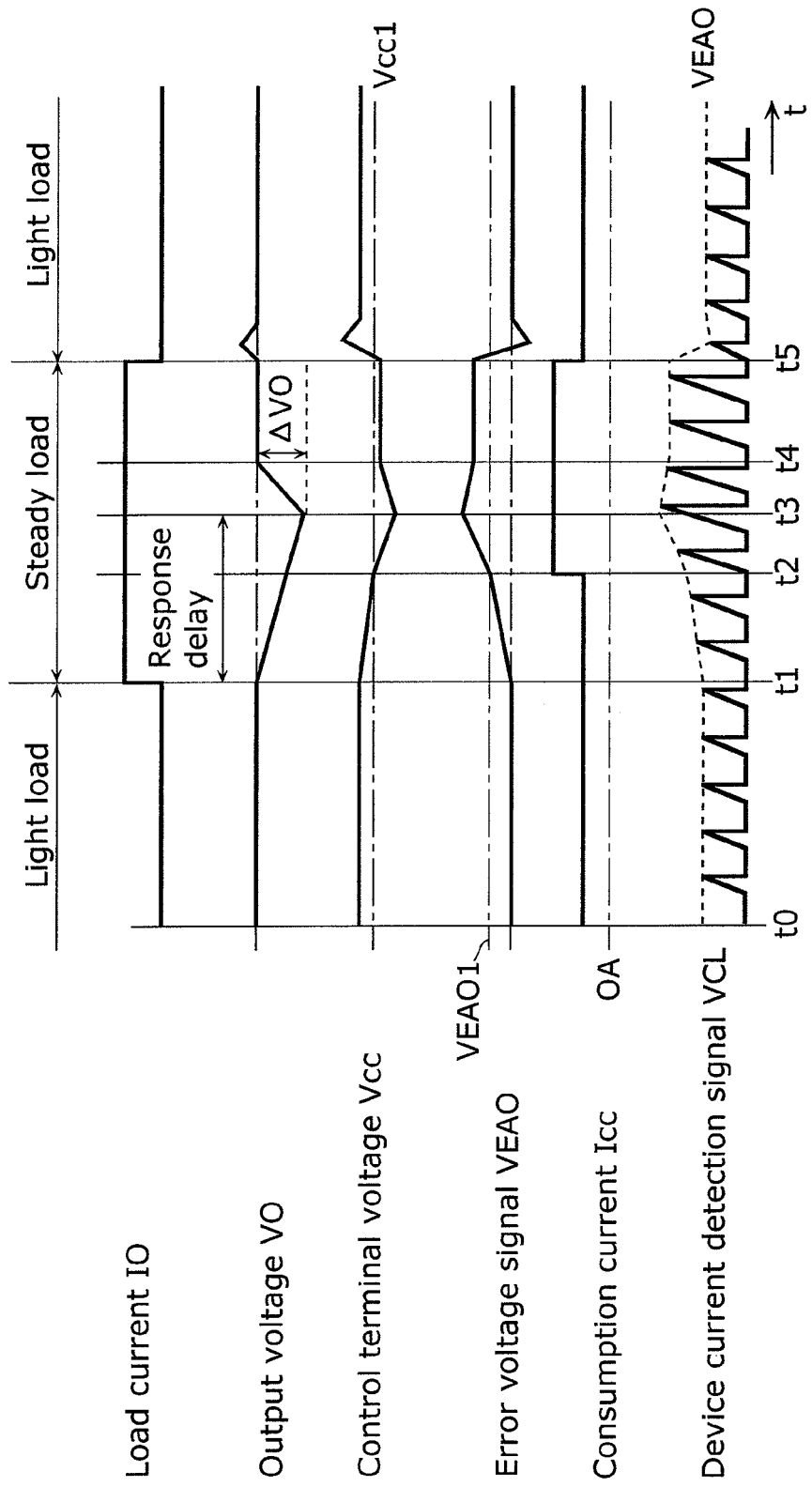
FIG. 3 is a timing chart showing an operation of the switching power supply apparatus at a time of sudden change in load current.

FIG. 3 is a timing chart showing an operation of the switching power supply apparatus 100 at the time of sudden change in a load current IO. In the figure, a period from time t1 and a period after time t5 are a light-load period during which the amount of the load current IO is small, and a period from time t1 to t5 is a steady-load period during which the amount of the load current IO is large. That is, the load current IO suddenly changes during the period from time t1 to t5.

During a period from time t0 to t1, the load current IO is constant. Accordingly, the output voltage VO, the control terminal voltage Vcc, and the error voltage signal VEAO are also constant. As a result, the switching device 21 repeats an operation of turning on each time the clock signal CLOCK becomes high and turning off each time the device current detection signal VCL becomes equal to the error voltage signal VEAO that is constant.

Next, the load current IO sharply increases when, at time t1, the load sharply increases to be heavier, that is, increases discontinuously. The control terminal voltage Vcc decreases accordingly. Thus, the error voltage signal VEAO increases in response to the control terminal voltage Vcc.

At time t2, when the error voltage signal VEAO becomes equal to the reference voltage VEAO1, the dummy control signal outputted from the comparator 41 is switched from high to low. This dummy control signal is inputted to the dummy load device 43 to cause the dummy load device 43 to turn on, so that the consumption current Icc of the control circuit 30 increases. With this, after time t2, the control terminal voltage Vcc sharply decreases as compared to before time t2, and the error voltage signal VEAO sharply increases in accordance with the sudden decrease. Accordingly, a period of time from when the switching device 21 turns on to when the device current detection signal VCL becomes equal to the error voltage signal VEAO suddenly becomes longer than the time before time t2. As a result, the switching device 21 is on for a longer time, so that the switching device current ID flowing in the switching device 21 increases. In other words, the duty cycle of the drive pulse signal is determined in accordance with the difference between the error voltage signal VEAO and the device current detection signal VCL.

As a result, at time t3, the output voltage VO turns upward. That is, compared to the response delay of the conventional switching power supply apparatus shown in FIG. 15, the response delay of the switching power supply apparatus 100 according to the present embodiment is shortened. As a result, it is possible to inhibit change in the output voltage ΔVO at the time of sudden change in the load.

Subsequently, at time t4, the output voltage VO returns to the voltage before the sudden change in the load, that is, the voltage before time t1.

At time t5, when the load suddenly becomes lighter, the load current IO sharply decreases. The control terminal voltage Vcc increases accordingly. Thus, the error voltage signal VEAO decreases in response to the control terminal voltage Vcc.

Subsequently, when the error voltage signal VEAO becomes lower than the reference voltage VEAO1, the dummy control signal outputted from the comparator 41 is switched from high to low, causing the dummy load device 43 to turn off. With this, the current is no longer supplied from the control terminal CONTROL to the dummy load device 40, so that the consumption current Icc decreases. This causes the error voltage signal VEAO to decrease more sharply, shortening a period of time from when the device current detection signal VCL rises to when the device current detection signal VCL becomes equal to the error voltage signal VEAO. As a result, this shortens the time for which the switching device 21 is on, thus causing the switching device current ID flowing in the switching device 21 to decrease. Accordingly, the output voltage VO turns downward, and subsequently returns to the voltage before the sudden change in the load.

Thus, the switching power supply apparatus 100 performs on-and-off control on the dummy load device 43 in accordance with the error voltage signal VEAO, causing the amount of the consumption current ICC to change. With this, since it is possible to inhibit change in the output voltage ΔVO at the time of sudden change in the load, it is possible to realize a stable switching operation.

As above, the switching power supply apparatus 100 according to the present embodiment includes: a drive circuit 50 which generates a drive pulse signal for driving the switching device 21, an error amplifier 33 which generates an error voltage signal VEAO depending on a difference between a control terminal voltage Vcc and a reference voltage Vcc1, a device current detection circuit 35 which detects a switching device current ID and generates a device current detection signal VCL which indicates an amount of the switching device current ID, and a dummy load circuit 40 through which a dummy load current flows from the control terminal CONTROL when the error voltage signal VEAO is equal to or higher than the reference voltage VEAO1. This drive circuit 50 changes the duty cycle of the drive pulse signal, based on the difference between the error voltage signal VEAO and the device current detection signal VCL.

With this, the dummy load current flowing at the time of sudden change in the load causes the control terminal voltage Vcc to decrease suddenly, thus expanding the duty cycle of the drive pulse signal accordingly, that is, increasing a period of time during which the drive pulse signal remains high in one cycle. Accordingly, it is possible to reduce the length of time from when the load starts changing to when a large amount of switching current starts flowing. This, as a result, can shorten the response delay in the output voltage VO, thus making it possible to reduce the change in the output voltage ΔVO.

Second Embodiment

Next is a description of a switching power supply apparatus according to a second embodiment of the present invention. The switching power supply apparatus according to the present embodiment is almost the same as the switching power supply apparatus 100 according to the first embodiment, but is different in the structure of the dummy load circuit. The description below will center on differences from the first embodiment.

Figure 4:
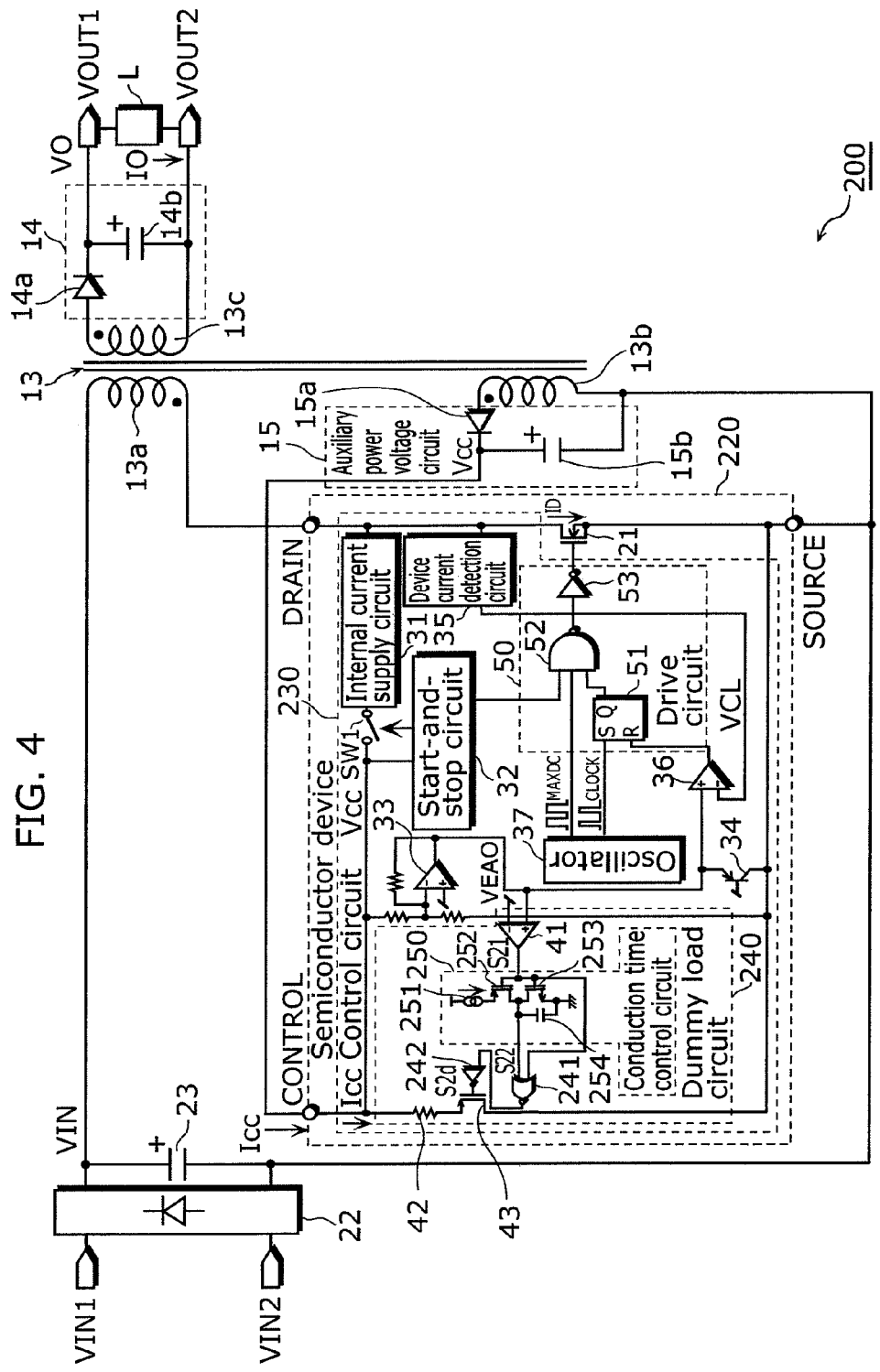
FIG. 4 is a circuit diagram showing an example of a configuration of a switching power supply apparatus according to a second embodiment of the present invention.
Figure 5:
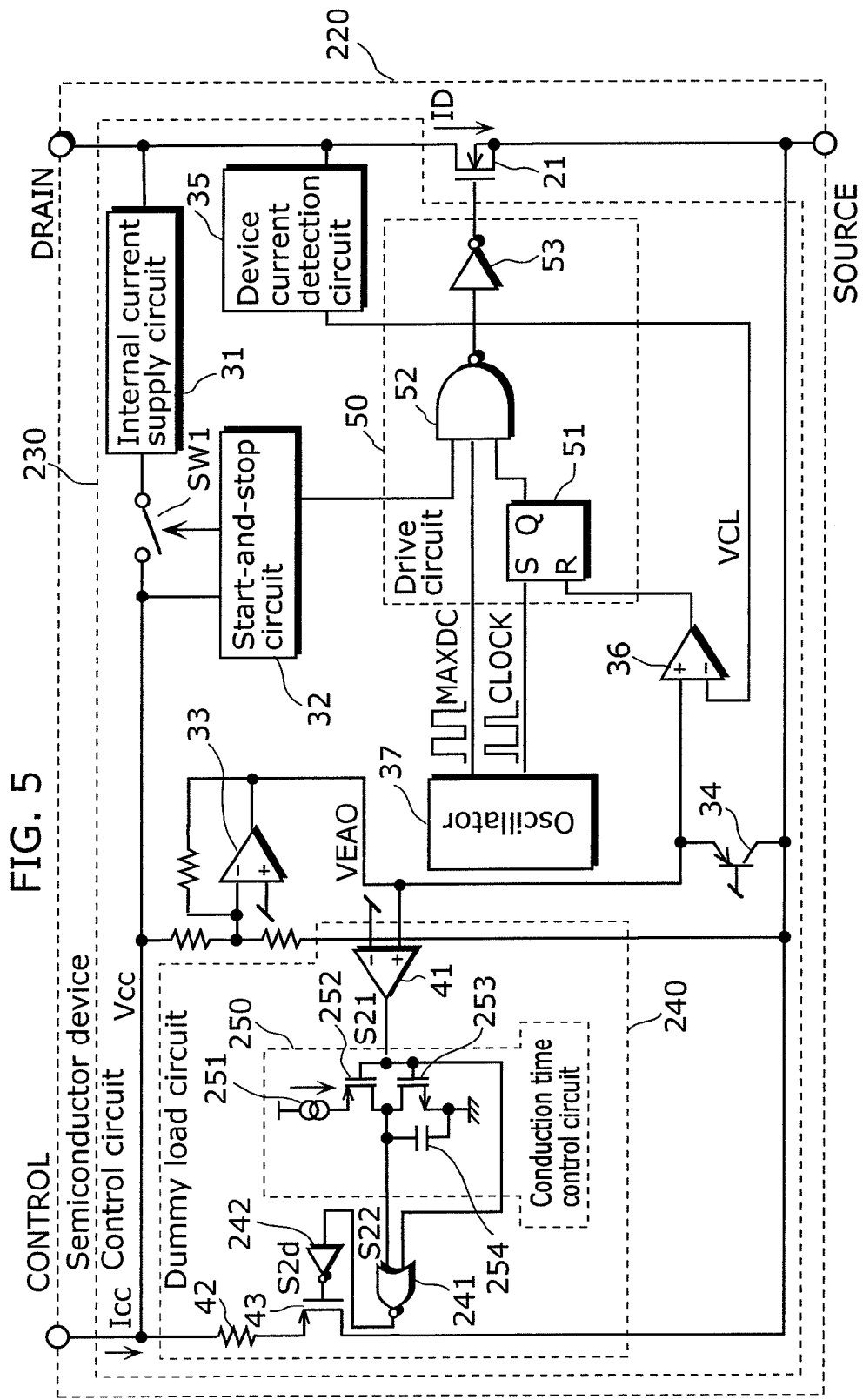
FIG. 5 is a circuit diagram showing an example of a configuration of a semiconductor device in the switching power supply apparatus according to the second embodiment of the present invention.

FIG. 4 is a circuit diagram showing an example of a configuration of the switching power supply apparatus according to the second embodiment of the present invention, and FIG. 5 is a circuit diagram showing an example of a configuration of a semiconductor device in the switching power supply apparatus according to the second embodiment of the present invention. Note that in FIGS. 4 and 5, the same numerical references are given to the same constituent elements as those in the switching power supply apparatus 100 of the first embodiment of the present invention, which is shown in FIGS. 1 and 2, and the descriptions thereof are omitted.

As shown in FIGS. 4 and 5, a switching power supply apparatus 200 according to the present embodiment includes a semiconductor device 220 having a different structure as compared to the switching power supply apparatus 100 according to the first embodiment. Specifically, the control circuit 230 has a different structure, and more specifically, a dummy load circuit 240 has a different structure. The following will describe the structure of the dummy load circuit 240.

As compared to the dummy load circuit 40 shown in FIG. 2, the dummy load circuit 240 shown in FIG. 5 further includes a NOR circuit 241, an inverter 242, and a conduction time control circuit 250. Note that in the first embodiment, the signal indicating a result of the comparison performed by the comparator 41 of the dummy load circuit 40 is inputted to a gate of the dummy load device 43; however, in the present embodiment, the signal is inputted to the conduction time control circuit 250 and the NOR circuit 241.

The NOR circuit 241, which has two input terminals, generates a signal indicating a NOR operation of a comparison result signal S21 that is a signal indicating the result of the comparison performed by the comparator 41 and an inversion delay signal S22 outputted from the conduction time control circuit 250, and outputs the generated signal to the inverter 242.

The inverter 242 generates a signal indicating a logical NOT of the signal outputted from the NOR circuit 241, and applies the signal to a gate of the dummy load device 43 as a dummy drive signal Std that is a dummy control signal.

The conduction time control circuit 250, which includes a constant current source 251, a p-type MOSFET 252, an n-type MOSFET 253, and a capacitor 254, generates the inversion delay signal S22 by inverting and delaying the comparison result signal S21 outputted from the comparator 41 for a given period of time (T1), and outputs the generated inversion delay signal S22 to the NOR circuit 241.

The constant current source 251, which is inserted between the power source and the p-type MOSFET 252, supplies a constant current to the p-type MOSFET 252.

The p-type MOSFET 252, which has a source connected to the constant current source 251 and a drain connected to a drain of the n-type MOSFET 253, turns on and off in accordance with the comparison result signal S21 applied to the gate. Note that the drain of the p-type MOSFET 252 is connected to an input terminal of the NOR circuit 241 and also to an end of the capacitor 254.

The n-type MOSFET 253, which has a drain connected to the drain of the p-type MOSFET 252 and a source connected to ground, turns on and off in accordance with the comparison result signal S21 applied to the gate.

The p-type MOSFET 252 and the n-type MOSFET 253 thus connected to each other function as an inverter which outputs the signal inverted from the comparison result signal S21 inputted to the gate.

The capacitor 254 has one end connected to the drain of the p-type MOSFET and the drain of the n-type MOSFET and the other end connected to ground. The capacitor 254 generates the inversion delay signal S22 by delaying, through charge and discharge for the given period of time (T1), the inverted signal of the comparison result signal S21 outputted from the drains of the p-type MOSFET and the n-type MOSFET.

The dummy load circuit 240 thus configured carries out a NOR operation of the comparison result signal S21 and the inversion delay signal S22 in the NOR circuit 241, and the inverter 242 inverts a result of the NOR operation. Thereby, the dummy load circuit 240 generates, as the dummy drive signal Std, a signal which remains low only for the period of time T1 after the comparison result signal S21 is switched to low. Accordingly, the dummy load device 43 turns on only for the period of time T1 after the comparison result signal S21 is switched to low, thus causing a dummy load current to flow.

Next is a description of how the switching power supply apparatus 200 configured as above operates at the time of sudden change in the load current.

Figure 6:
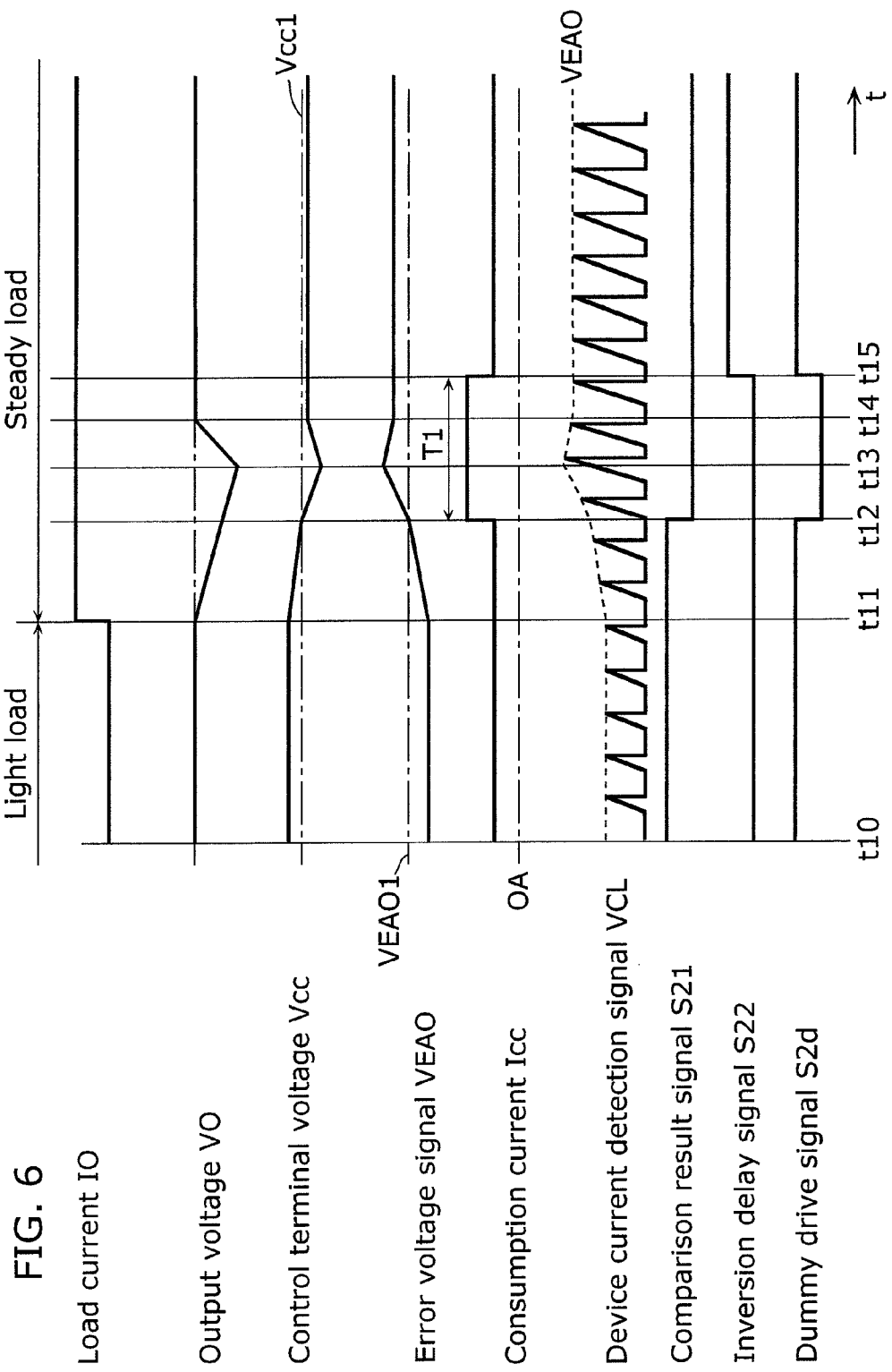
FIG. 6 is a timing chart showing an operation of the switching power supply apparatus at a time of sudden change in load current.

FIG. 6 is a timing chart showing the operation of the switching power supply apparatus 200 at the time of sudden change in a load current IO.

At time t11, when the load current IO increases, the control terminal voltage Vcc decreases, and the error voltage signal VEAO increases accordingly.

At time t12, when the error voltage signal VEAO is equal to or higher than the reference voltage VEAO1, the comparison result signal S21 outputted from the comparator 41 is switched from high to low. At this time, the inversion delay signal S22 remains low as before time t1. Accordingly, the dummy drive signal S2d is switched from high to low, causing the dummy load device 43 to turn on, so that the consumption current Icc increases.

At time t15, after a lapse of the period of time T from time t12, the inversion delay signal S22 is switched from low to high. At this time, since the control terminal voltage Vcc is lower than the reference voltage Vcc1, the comparison result signal S21 remains low. Accordingly, the dummy drive signal S2d is switched from low to high, causing the dummy load device 43 to turn off, so that the consumption current Icc decreases. As a result, the dummy load circuit 240 can reduce the consumption current Icc after time t15.

As described above, the switching power supply apparatus 200 according to the second embodiment includes the conduction time control circuit 250 which keeps the dummy drive signal S2d at the low level for a given period of time after the control terminal voltage Vcc becomes equal to or higher than the reference voltage Vcc1. This makes it possible to reduce the consumption current Icc during the steady load period.

Third Embodiment

Next is a description of a switching power supply apparatus according to a third embodiment of the present invention. The switching power supply apparatus according to the present embodiment is almost the same as the switching power supply apparatus 100 according to the first embodiment, but is different in that the control circuit further includes an intermittent oscillation circuit and in the structure of the dummy load circuit.

Figure 7:
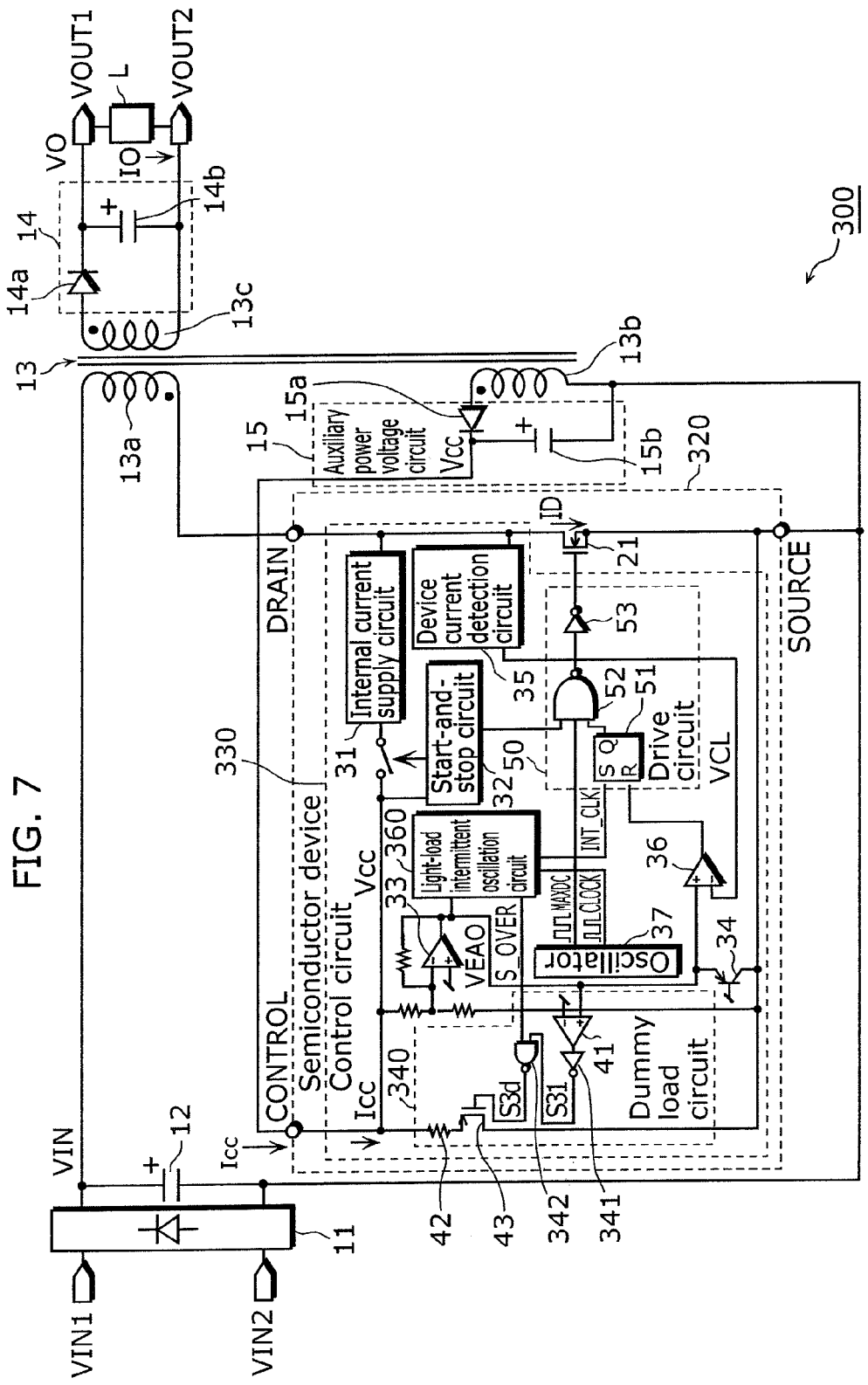
FIG. 7 is a circuit diagram showing an example of a configuration of a switching power supply apparatus according to a third embodiment of the present invention.
Figure 8:
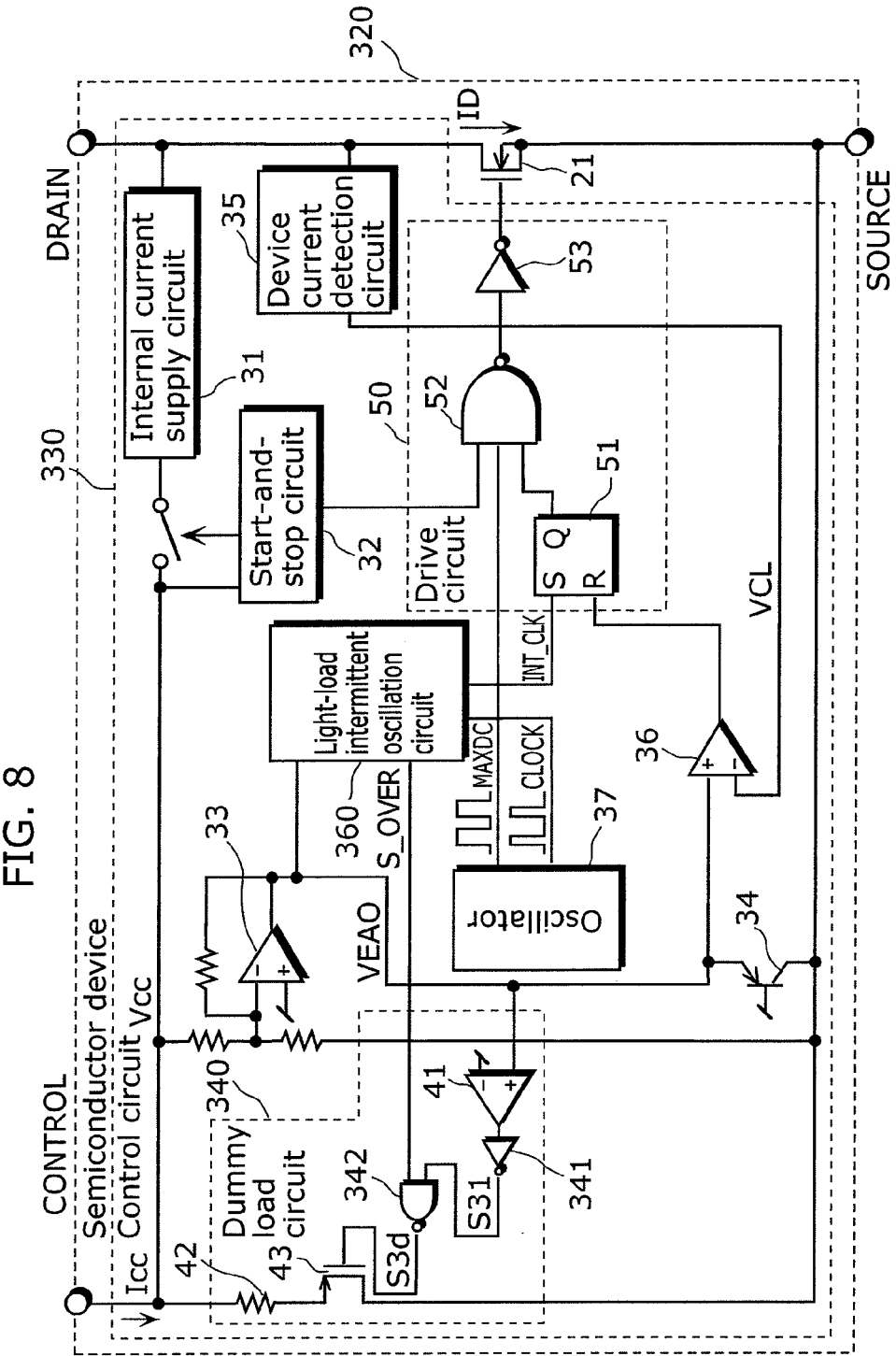
FIG. 8 is a circuit diagram showing an example of a configuration of a semiconductor device in the switching power supply apparatus according to the third embodiment of the present invention.

FIG. 7 is a circuit diagram showing an example of a configuration of the switching power supply apparatus according to the third embodiment of the present invention, and FIG. 8 is a circuit diagram showing an example of a structure of a semiconductor device included in the switching power supply apparatus according to the third embodiment of the present invention. Note that in FIGS. 7 and 8, the same numerical references are given to the same constituent elements as those in the switching power supply apparatus 100 of the first embodiment of the present invention, which is shown in FIGS. 1 and 2, and the descriptions thereof are omitted.

As shown in FIGS. 7 and 8, a switching power supply apparatus 300 according to the present embodiment includes a semiconductor device 320 having a different structure as compared to the switching power supply apparatus 100 according to the first embodiment. Specifically, the control circuit 330 has a different structure, and more specifically, a dummy load circuit 340 has a different structure. The following will describe the structure of the dummy load circuit 340.

As compared to the control circuit 30 shown in FIG. 1, the control circuit 330 shown in FIG. 8 further includes a light-load intermittent oscillation circuit 360, and a dummy load circuit 340 in place of the dummy load circuit 40.

The light-load intermittent oscillation circuit 360, which corresponds to the intermittent oscillation circuit in the present invention, causes the drive circuit 50 to stop generating a drive pulse signal when the error voltage signal VEAO becomes lower than a lower limit reference voltage, and causes the drive circuit 50 to start generating the drive pulse signal when the error voltage signal VEAO becomes higher than an upper limit reference voltage that is higher than the lower limit reference voltage. The light-load intermittent oscillation circuit 360 receives an input of the error voltage signal VEAO from the error amplifier 33 and an input of the clock signal CLOCK from the oscillator 37, and outputs an intermittent clock signal INT_CLK to a set terminal S of the RS flip-flop circuit 51 and outputs an over signal S_OVER to the dummy load circuit 340.

Specifically, the light-load intermittent oscillation circuit 360 causes the drive circuit 50 to stop generating the drive pulse signal when the inputted error voltage signal VEAO becomes higher than an upper limit reference voltage of a reference voltage VEAO2, and causes the drive circuit 50 to start generating the drive pulse signal when the error voltage signal VEAO becomes lower than a lower limit reference voltage of the reference voltage VEAO2.

In other words, when the error voltage signal VEAO is higher than the reference voltage signal VEAO2, that is, during a period from when the error voltage signal VEAO exceeds the upper limit reference voltage to when the error voltage signal VEAO becomes lower than the lower limit reference voltage, the light-load intermittent oscillation circuit 360 causes the drive circuit 50 to generate the drive pulse signal by outputting, to the set terminal S of the RS flip-flop circuit 51, the clock signal CLK inputted from the oscillator 37. On the other hand, when the error voltage signal VEAO is lower than the reference voltage signal VEAO2, that is, during a period from when the error voltage VEAO becomes equal to the lower limit reference voltage to when the error voltage VEAO becomes equal to the upper limit reference voltage, the light-load intermittent oscillation circuit 360 causes the drive circuit 50 to stop generating the drive pulse signal by outputting a low-level signal to the set terminal S of the RS flip-flop circuit 51. In other words, the intermittent clock signal INT_CLK is identical to the clock signal CLOCK during the period from when the error voltage signal VEAO exceeds the upper limit reference voltage to when the error voltage signal VEAO becomes lower than the lower limit reference voltage; and the intermittent clock signal INT_CLK remains a low-level signal during the period from when the error voltage VEAO becomes equal to the lower limit reference voltage to when the error voltage VEAO becomes equal to the upper limit reference voltage.

In addition, the light-load intermittent oscillation circuit 360 generates a high-level over signal S_OVER when the error voltage signal VEAO is higher than the upper limit reference voltage of the reference voltage signal VEAO2, and a low-level over signal S_OVER when the error voltage signal VEAO is equal to or lower than the lower limit reference voltage of the reference voltage signal VEAO2.

Thus, the light-load intermittent oscillation circuit 360 causes the drive circuit 50 to stop generating the drive pulse signal when the error voltage signal VEAO becomes lower than the lower limit reference voltage, and causes the drive circuit 50 to start generating the drive pulse signal when the error voltage signal VEAO becomes higher than the upper limit reference voltage.

As compared to the dummy load circuit 40 shown in FIG. 2, the dummy load circuit 340 further includes an inverter 341 and a NAND circuit 342. Note that in the first embodiment, the signal indicating the result of the comparison performed by the comparator 41 of the dummy load circuit 40 is inputted to the gate of the dummy load device 43; however, in the present embodiment, the signal is inputted to an input terminal of the inverter 341.

The inverter 341 generates a comparison inversion signal S31 representing a logical NOT of the signal indicating the result of the comparison performed by the comparator 41 and outputs the comparison inversion signal S31 to an input terminal of the NAND circuit 342.

The NAND circuit 342, which has two terminals, generates a dummy drive signal S3d that is a signal representing a negative AND of the comparison inversion signal S31 outputted from the inverter 341 and the over signal S_OVER outputted from the light-load intermittent oscillation circuit 360, and outputs the dummy drive signal S3d to the gate of the dummy load device 43. Note that the dummy drive signal S3d corresponds to the dummy control signal.

In the dummy load circuit 340 thus configured, a dummy load current is caused to flow by the dummy load device 43 turning on, when the over signal S_OVER and the comparison inversion signal S31 are switched to the high level, that is, when the error voltage signal VEAO is higher than either the upper limit reference voltage of the reference voltage VEAO2 or the reference voltage VEAO1. In other words, when the error voltage signal VEAO is lower than the upper limit reference voltage, the light-load intermittent oscillation circuit 360 inhibits the operation of the dummy load circuit 340, that is, inhibits the dummy load circuit 340 from applying the dummy load current, by generating a low-level over signal S_OVER.

Next is a description of how the switching power supply apparatus 300 configured as above operates at a time of sudden change in the load current.

Figure 9:
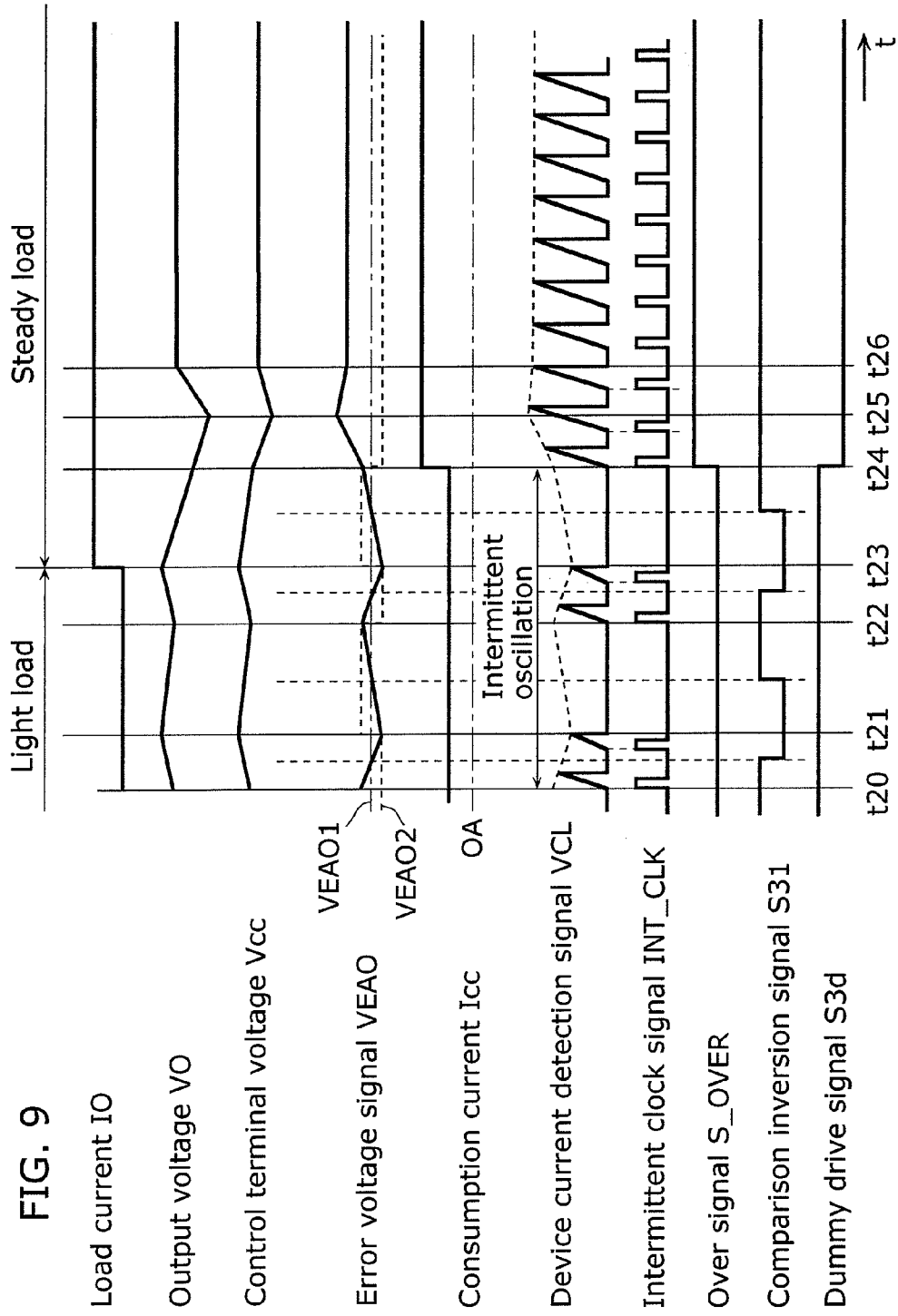
FIG. 9 is a timing chart showing an operation of a switching power supply apparatus 300 at a time of sudden change in a load current IO.

FIG. 9 is a timing chart showing an operation of a switching power supply apparatus 300 at a time of sudden change in a load current IO.

Time t20 to t21 is a period from when the error voltage signal VEAO exceeds the upper limit reference voltage of the reference voltage VEAO2 to when the error voltage signal VEAO becomes lower than the lower limit reference voltage, and the intermittent oscillation clock INT_CLK is identical to the clock signal CLOCK. At this time, the over signal S_OVER is low because the error voltage signal VEAO is equal to or lower than the upper limit reference voltage of the reference voltage VEAO2. In addition, the comparison inversion signal S31 is switched from high to low at a point when the error voltage signal VEAO becomes equal to or lower than the reference voltage VEAO1.

In addition, the voltage level of the reference voltage VEAO2 is switched from the lower limit reference voltage to the upper limit reference voltage. Subsequently, this state continues until, at time t22, the error voltage signal VEAO exceeds the upper limit reference voltage of the reference voltage VEAO2. Note that the comparison inversion signal S31 is switched from low to high when the error voltage signal VEAO exceeds the reference voltage VEAO1.

Subsequently, the operation described above is repeated until time t24. That is, an intermittent operation is performed, in which the switching device 21 is caused to stop oscillating when the error voltage signal VEAO is lower than the lower limit reference voltage of the reference voltage VEAO2, and to oscillate when the error voltage signal VEAO is higher than the upper limit reference voltage of the reference voltage VEAO2. This intermittent operation can reduce, during the light-load period, the number of times of switching to be performed by the switching device 21, thereby making it possible to reduce switching loss.

Next, at time t24, when the error voltage signal VEAO is higher than the reference voltage VEAO1 and higher than the upper limit reference voltage of the reference voltage VEAO2, the over signal S_OVER is switched from low to high. At this time, since the comparison inversion signal S31 is a high-level signal, the dummy drive signal S3d is switched from high to low. Accordingly, the dummy load device 43 turns on, so that the consumption current Icc increases.

As a result, the control terminal voltage Vcc sharply decreases compared to a period before time t24, and the error voltage signal VEAO sharply increases accordingly, so that, as in the first embodiment, the duty cycle of the drive pulse signal from the switching device 21 is expanded. As a result, it is possible to shorten the response delay of the output voltage VO, thus reducing the change in the output voltage.

As described above, the switching power supply apparatus 300 according to the present embodiment includes a light-load intermittent oscillation circuit 360 which causes the drive circuit 50 to stop generating the drive pulse signal when the error voltage signal VEAO becomes lower than the lower limit reference voltage of the reference voltage VEAO2, and causes the drive circuit 50 to start generating the drive pulse signal when the error voltage signal VEAO becomes higher than the upper limit reference voltage of the reference voltage VEAO2. This reduces, during the light-load period, the number of times per unit time of the switching performed by the switching device 21, thereby making it possible to reduce the switching loss.

In addition, the light-load intermittent oscillation circuit 360 inhibits the operation of the dummy load circuit 340, that is, causes the dummy load device 43 to turn off, when the upper limit reference voltage of the reference voltage VEAO2 is higher than the reference voltage VEAO1 and when the error voltage signal VEAO is equal to or lower than the upper limit reference voltage of the reference voltage VEAO2. This makes it possible to reduce the consumption current Icc during the light-load period. In addition, during the steady-load period, the consumption current Icc is caused to increase quickly when the error voltage signal VEAO exceeds the upper limit reference voltage of the reference voltage VEAO2, thus expanding the duty cycle of the drive pulse signal. As a result, it is possible to shorten the response delay of the output voltage VO, thus reducing the change in the output voltage.

Fourth Embodiment

Next is a description of a switching power supply apparatus according to a fourth embodiment of the present invention. The switching power supply apparatus according to the present embodiment is almost the same as the switching power supply apparatus 300 according to the third embodiment, but is different in that a counter circuit is further included and that the dummy load circuit has a different structure.

Figure 10:
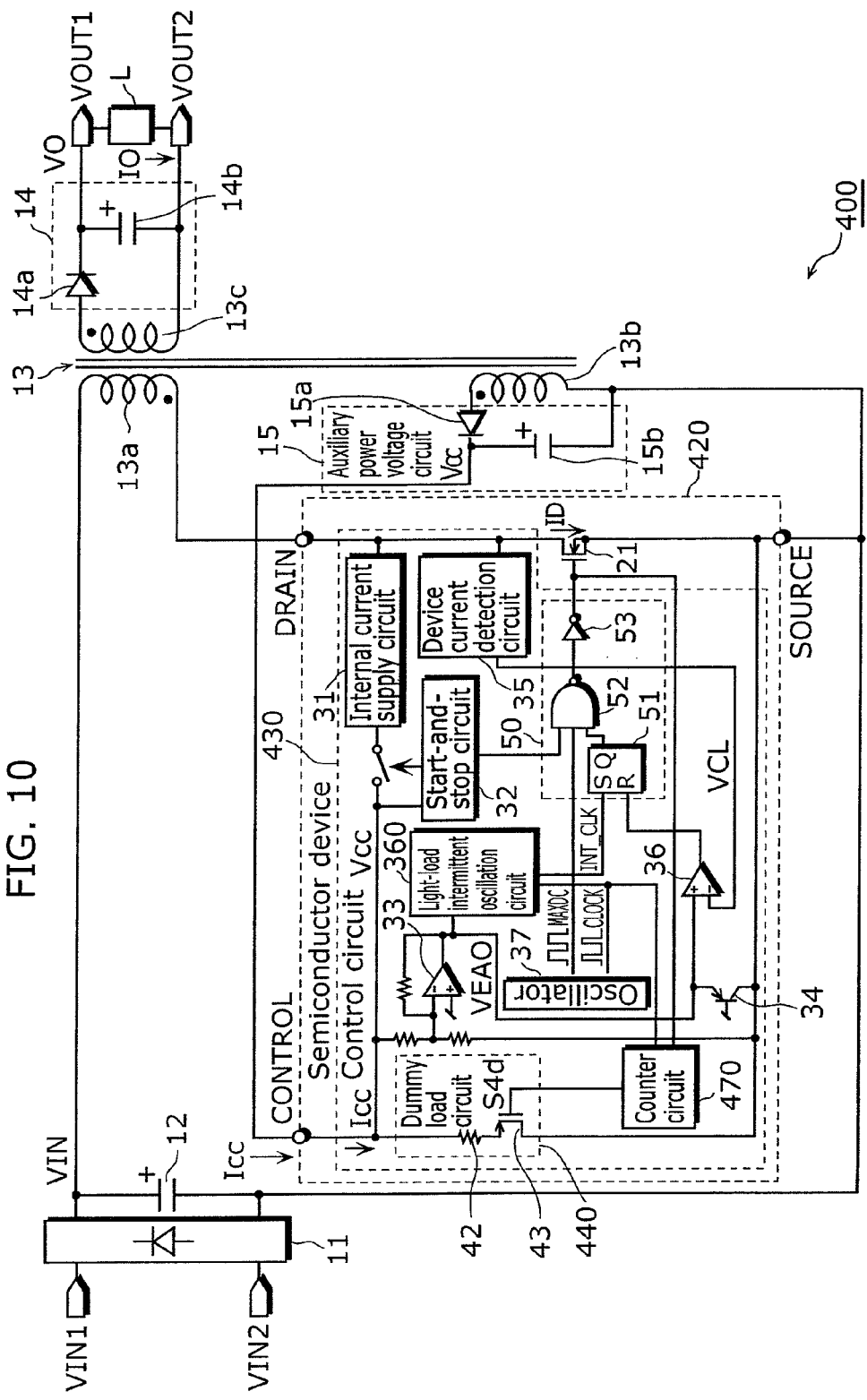
FIG. 10 is a circuit diagram showing an example of a configuration of a switching power supply apparatus according to a fourth embodiment of the present invention.
Figure 11:
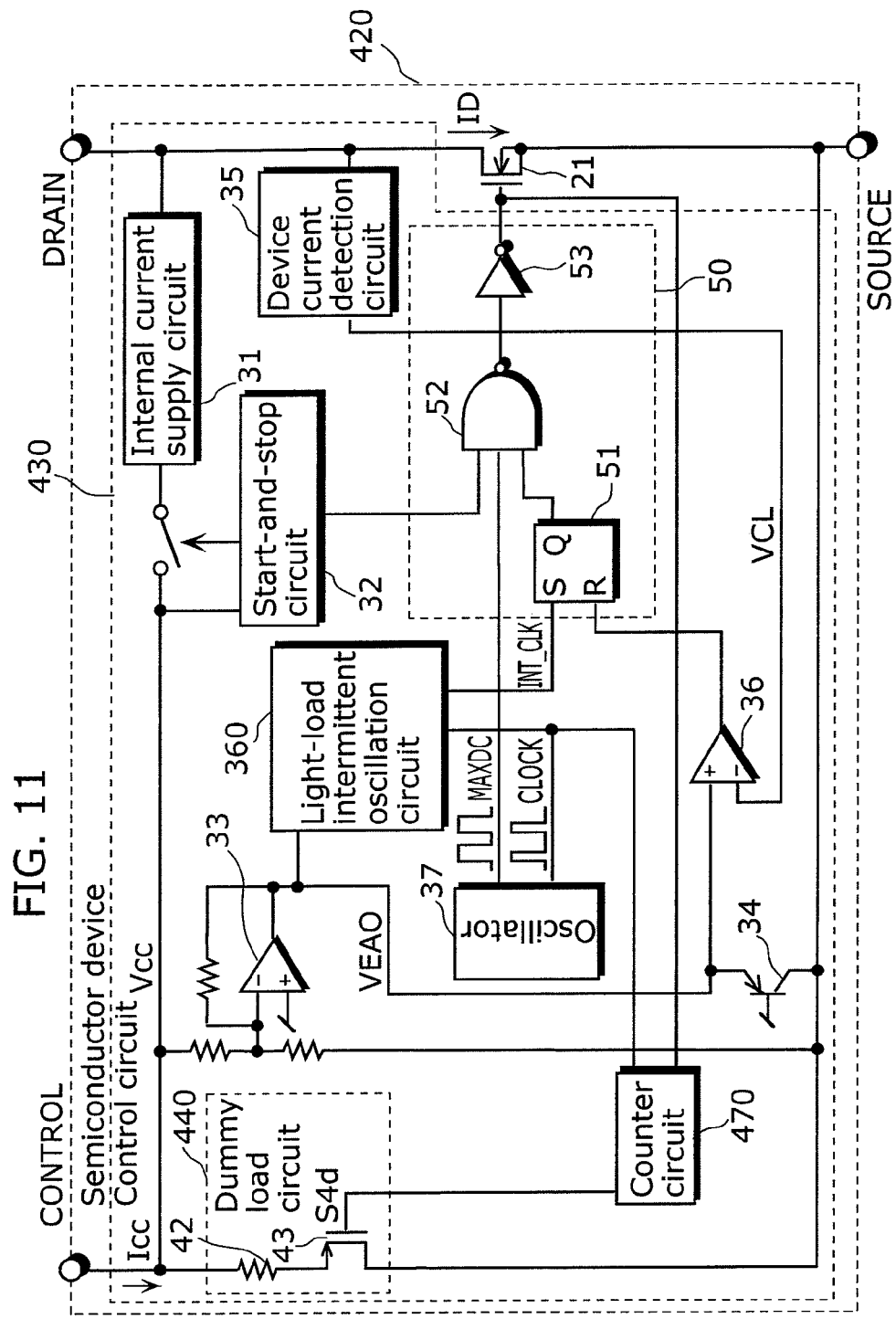
FIG. 11 is a circuit diagram showing an example of a configuration of a semiconductor device included in the switching power supply apparatus according to the fourth embodiment of the present invention.

FIG. 10 is a circuit diagram showing an example of a configuration of the switching power supply apparatus according to the fourth embodiment of the present invention, and FIG. 11 is a circuit diagram showing an example of a semiconductor device included in the switching power supply apparatus according to the fourth embodiment of the present invention. Note that in FIGS. 10 and 11, the same numerical references are given to the same constituent elements as those in the switching power supply apparatus 300 of the third embodiment of the present invention, which is shown in FIGS. 7 and 8, and the descriptions thereof are omitted.

As shown in FIGS. 10 and 11, a switching power supply apparatus 400 according to the present embodiment includes a semiconductor device 420 having a different structure as compared to the switching power supply apparatus 300 according to the third embodiment. Specifically, the control circuit 430 has a different structure. The following will describe the structure of the control circuit 430.

As compared to the control circuit 330 shown in FIG. 8, the control circuit 430 shown in FIG. 11 further includes a counter circuit 470, and a dummy load circuit 440 in place of the dummy load circuit 340. Note that the light-load intermittent oscillation circuit 360 shown in the figure need not output or generate the over signal S_OVER. In addition, the oscillator 37 also outputs a clock signal CLOCK to the counter circuit 470, and the gate driver 53 also outputs the drive pulse signal to the counter circuit 470.

The counter circuit 470 receives an input of the clock signal CLOCK outputted from the oscillator 37 and an input of the drive pulse signal outputted from the drive circuit 50, and generates, in accordance with the clock signal CLOCK and the drive pulse signal, a dummy drive signal S4d that is a dummy control signal, so as to output the dummy drive signal S4d to the dummy load circuit 440. The dummy drive signal S4d indicates a period during which the drive pulse signal is sequentially generated more than a predetermined N times (for example, 2 times), that is, a period during which the switching device 21 sequentially performs switching at least N times.

Specifically, the counter circuit 470 counts the number of times of the switching performed by the switching device 21, based on the drive pulse signal, and identifies a period of time for which the switching device 21 oscillates, based on the drive pulse signal and the clock signal CLOCK. That is, the count is incremented by one when the drive pulse signal rises as the clock signal CLOCK rises. On the other hand, the count is reset to 0 when the drive pulse signal does not rise as the clock signal CLOCK rises. Then, the dummy drive signal S4d is switched from high to low at a point when the count reaches N+1. Subsequently, the dummy drive signal is switched from low to high at a point when the count becomes 0.

With this, the counter circuit 470 generates the dummy drive signal S4d which remains low during a period when the drive pulse signal is sequentially generated more than the predetermined N times. In other words, the dummy drive signal S4d remains low during a period when the switching device 21 sequentially performs the switching more than N times.

As compared to the dummy load circuit 340, the dummy load circuit 440 only includes a resistor 42 and a dummy load device 43. The gate of the dummy load device 43 is applied with the dummy drive signal S4d outputted from the counter circuit 470. With this, the dummy load device 43 applies a dummy load current by remaining on during a period when the pulse of the drive pulse signal is sequentially generated more than the predetermined N times.

Next is a description of how the switching power supply apparatus 400 configured as above operates at a time of sudden change in load current.

Figure 12:
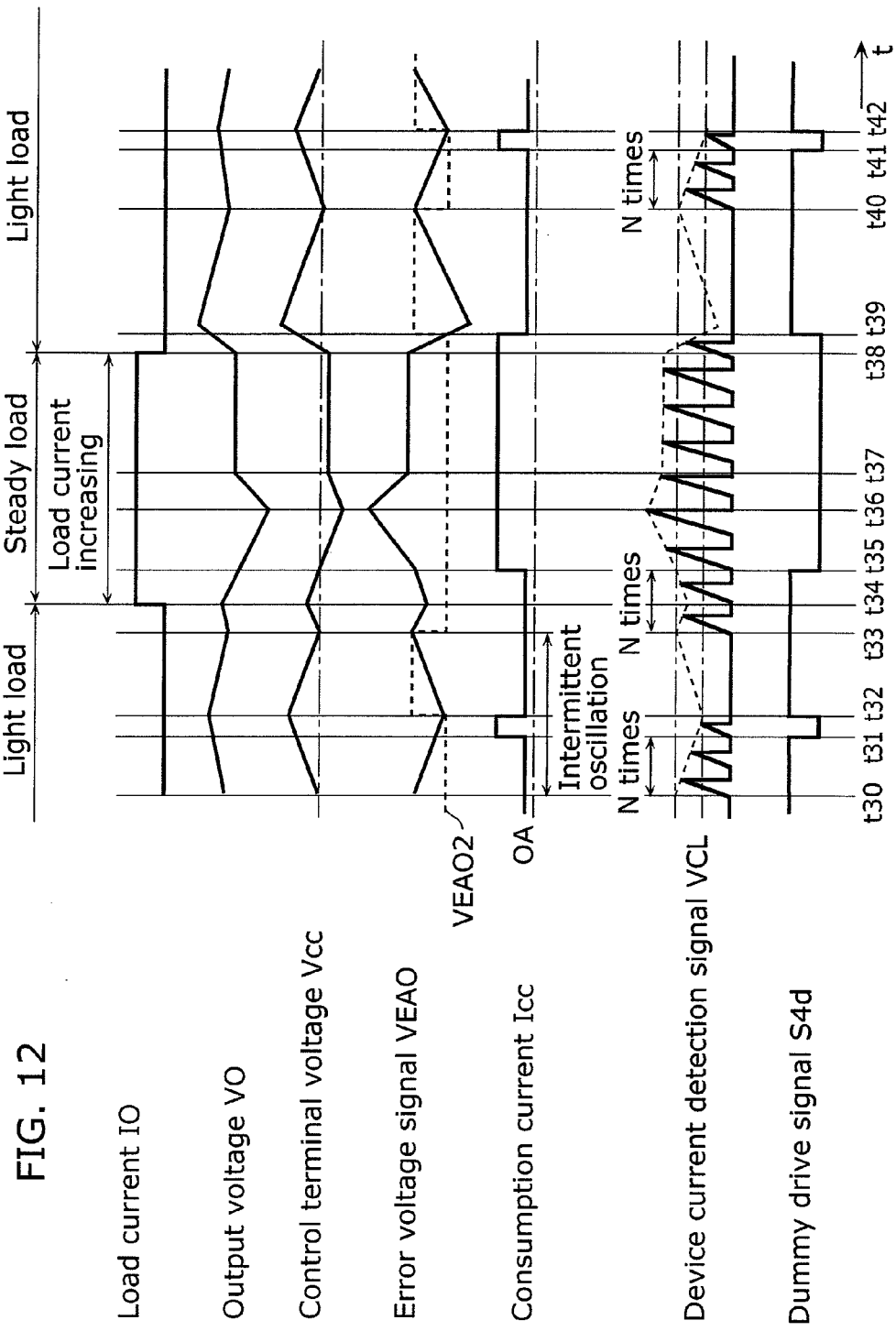
FIG. 12 is a timing chart showing an operation of the switching power supply apparatus at a time of sudden change in the load current IO.
Figure 13:
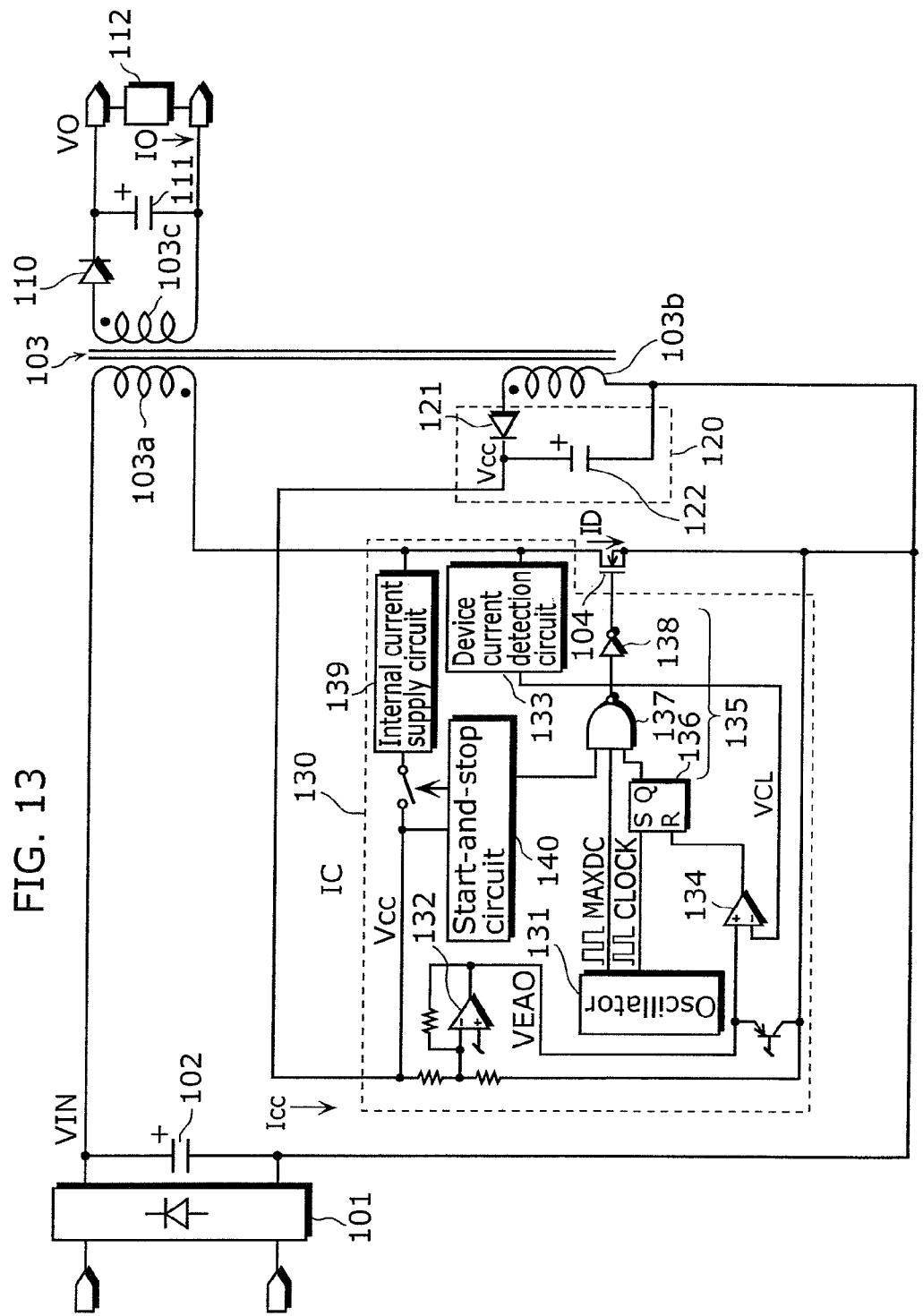
FIG. 13 is a circuit diagram showing a circuit configuration of a switching power supply apparatus of which an input side and an output side are electrically insulated.

FIG. 12 is a timing chart showing an operation of the switching power supply apparatus 400 at a time of sudden change in a load current IO.

First, in a period from time t30 to t31, the switching device 21 performs switching two times. Accordingly, immediately before time t31, the count at the counter circuit 470 is 2.

Next, at time t31, since the error voltage signal VEAO is equal to or higher than the lower limit reference voltage of the reference voltage VEAO2 when the clock signal CLOCK rises, the light-load intermittent oscillation circuit 360 raises the intermittent clock signal INT_CLK. Accordingly, the drive pulse signal rises, and the count at the counter circuit 470 is 3. As a result, the counter circuit 470 switches the dummy drive signal S4d from high to low. Accordingly, the dummy load device 43 turns on, and the dummy current flows, thus increasing the consumption current Icc.

Subsequently, since by time t32 the error voltage VEAO becomes lower than the lower limit reference voltage of the reference voltage VEAO2, the intermittent clock signal INT_CLK remains low, and the drive pulse signal remains low when the clock signal CLOCK rises at time t32. Accordingly, the counter circuit 470 resets the count to 0 and switches the dummy drive signal S4d from low to high.

Subsequently, by repeating the operation described above, the switching power supply apparatus 400 increases the consumption power Icc of the control circuit 430 by the turning on of the dummy load device 43 after the switching device 21 oscillates the predetermined number of times (N times), after the error voltage signal VEAO becomes equal to or higher than the reference voltage VEAO2 as shown at time t35 and t41. In addition, the dummy load device 43 turns off when the error voltage signal VEAO becomes lower than the reference voltage VEAO2 as shown at time t39 and t42.

This causes the control terminal voltage Vcc to sharply decrease when the load current IO increases, and causes the error voltage signal VEAO outputted from the error amplifier 33 to sharply increase. When the error voltage signal VEAO becomes equal to the device current detection signal VCL, the comparator 36 outputs, to a reset terminal R of the RS flip-flop circuit 9, the comparison result signal indicating a reset timing, thus expanding the duty cycle of the drive pulse signal. As a result, the switching device 21 is on for a longer time during the switching operation, so that the switching device current ID flowing in the switching device 21 increases.

As a result, the output voltage VO turns up, thereby inhibiting change in the output voltage when the output voltage suddenly changes. On the other hand, in the case of a small amount of load current IO, the switching device 21 intermittently oscillates as in the case of the third embodiment, and when the switching device 21 oscillates less than the predetermined number of times (N times), it is possible to inhibit increase in the consumption current Icc in the control circuit 130 during the intermittent oscillation for the light-load, by turning off the dummy load device 43.

As described above, in the switching power supply apparatus 400 according to the present embodiment, the dummy load current flows when the count at the counter circuit 470 exceeds the N times, thereby causing the control terminal voltage Vcc to sharply decrease, so that the duty cycle of the drive pulse signal changes accordingly.

For example, the drive pulse signal remains active for a longer period of time during one cycle. As a result, it is possible to inhibit the change in the output voltage VO.

Thus far, the switching power supply apparatus according to the present invention has been described based on the embodiments as above, but the present invention is not limited to these embodiments. Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

For example, the logic levels represented by high and low and the switching statuses represented by on and off are mere examples for a specific description of the present invention, and it is also possible to obtain an equivalent result by using a different combination of the logic levels or the switching status exemplified above. In addition, the relationships of the connection between the constituent elements are mere examples for a specific description of the present invention, and the relationship of connection that achieves the functions as described in the present invention is not limited to these. Furthermore, the embodiments described above are configured with hardware and/or software, but a configuration using the hardware is configurable by using the software, and a configuration using the software is also configurable by using the hardware.

In addition, the semiconductor device can be provided on the same semiconductor substrate so as to be unified easily. Accordingly, it is possible to reduce the number of components to configure the circuit with, by providing the major circuit components on a single semiconductor substrate, thereby making it possible to easily achieve, as a switching power supply apparatus, reduction in size and weight, and furthermore, cost reduction. In addition, only the control circuit may be formed on the same semiconductor substrate, separately from the switching device 21.

INDUSTRIAL APPLICABILITY

The present invention is applicable to a switching power supply apparatus, and is particularly applicable to an embedded power source for a consumer device and various types of electronic devices.

What is claimed is:

1. A switching power supply apparatus, comprising:
   a transformer including a primary winding, a secondary winding, and an auxiliary winding;
   a switching device connected in series with said primary winding;
   an auxiliary power voltage circuit which is connected to said auxiliary winding and is configured to generate an auxiliary power voltage by using an alternating-current voltage induced in said auxiliary winding; and
   a control circuit configured to control an operation of said switching device,
   wherein said control circuit includes:
   a power source terminal through which the auxiliary power voltage is supplied;
   a difference device configured to generate a difference voltage depending on a difference between the auxiliary power voltage and a first reference voltage;
   a device current detection circuit configured to detect a device current flowing in said switching device, and to generate a device current detection signal indicating an amount of the device current;
   a drive circuit configured to generate a drive pulse signal having a duty cycle based on a difference between the difference voltage and the device current detection signal, and to drive said switching device by using the generated drive pulse signal; and
   a dummy load circuit through which a dummy load current flows from said power source terminal when the difference voltage becomes equal to or higher than a second reference voltage.

2. The switching power supply apparatus according to claim 1,
   wherein said control circuit further includes an oscillator which generates a first clock signal, and
   said drive circuit is configured to activate the drive pulse signal in accordance with the first clock signal, and to deactivate the drive pulse signal when the device current detection signal becomes equal to the difference voltage.

3. The switching power supply apparatus according to claim 2,
   wherein said dummy load circuit includes:
   a resistor having one end connected to said power source terminal; and
   a dummy load transistor which has one of a source and a drain connected to another end of said resistor and is configured to turn on and off according to a dummy control signal indicating that the difference voltage applied to a gate has become equal to or higher than the second reference voltage.

4. The switching power supply apparatus according to claim 3
   wherein said dummy load circuit further includes
   a conduction time control circuit configured to activate the dummy control signal for a given period of time from when the difference voltage becomes equal to or higher than the second reference voltage.

5. The switching power supply apparatus according to claim 2,
   wherein said control circuit further includes
   an intermittent oscillation circuit configured to cause said drive circuit to stop generating the drive pulse signal when the difference voltage becomes lower than a lower limit reference voltage, and to cause said drive circuit to start generating the drive pulse signal when the difference voltage becomes higher than an upper limit reference voltage that is higher than the lower limit reference voltage.

6. The switching power supply apparatus according to claim 5,
   wherein the upper limit reference voltage is higher than the second reference voltage, and
   said intermittent oscillation circuit is configured to inhibit said dummy load circuit from operating when the difference voltage signal is equal to or lower than the upper limit reference voltage.

7. The switching power supply apparatus according to claim 2,
   wherein said oscillator is configured to generate a second clock signal for limiting a maximum length of period for which the drive pulse signal remains active.

8. A switching power supply apparatus, comprising:
   a transformer including a primary winding, a secondary winding, and an auxiliary winding;
   a switching device connected in series with said primary winding;
   an auxiliary power voltage circuit which is connected to said auxiliary winding and is configured to generate an auxiliary power voltage by using an alternating-current voltage induced in said auxiliary winding; and
   a control circuit configured to control an operation of said switching device,
   wherein said control circuit includes:
   a power source terminal through which the auxiliary power voltage is supplied;
   a difference device configured to generate a difference voltage depending on a difference between the auxiliary power voltage and a first reference voltage;
   a device current detection circuit configured to detect a device current flowing in the switching device, and to generate a device current detection signal indicating an amount of the device current;
   a drive circuit configured to generate a drive pulse signal having a duty cycle based on a difference between the difference voltage and the device current detection signal, and to drive said switching device by using the generated drive pulse signal;
   an intermittent oscillation circuit configured to cause said drive circuit to stop generating the drive pulse signal when the difference voltage becomes lower than a lower limit reference voltage, and to cause said drive circuit to start generating the drive pulse signal when the difference voltage becomes higher than an upper limit reference voltage that is higher than the lower limit reference voltage; and
   a dummy load circuit through which a dummy load current flows from said power source terminal during a period when the drive pulse signal is sequentially generated more than a predetermined number of times.

* * * * *